US012422243B2

(12) United States Patent
Yamaguchi

(10) Patent No.: US 12,422,243 B2
(45) Date of Patent: Sep. 23, 2025

(54) SENSOR DEVICE AND MODULE

(71) Applicant: Magnolia White Corporation, Tokyo (JP)

(72) Inventor: Hajime Yamaguchi, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 377 days.

(21) Appl. No.: 17/950,121

(22) Filed: Sep. 22, 2022

(65) Prior Publication Data
US 2023/0016015 A1 Jan. 19, 2023

Related U.S. Application Data

(63) Continuation of application No. PCT/JP2021/010189, filed on Mar. 12, 2021.

(30) Foreign Application Priority Data

Mar. 25, 2020 (JP) ................. 2020-054361

(51) Int. Cl.
G01N 27/00 (2006.01)
G01B 7/16 (2006.01)
G01B 7/28 (2006.01)

(52) U.S. Cl.
CPC .................... G01B 7/28 (2013.01); G01B 7/16 (2013.01)

(58) Field of Classification Search
CPC ............ G01N 3/20; G01N 2203/0005; G01N 2203/0051; G01N 2203/0623; G01B 7/16;
(Continued)

(56) References Cited

U.S. PATENT DOCUMENTS

2005/0213799 A1* 9/2005 Sawano ............. G06V 40/1306
382/124
2007/0112283 A1* 5/2007 Ando .................... A61B 5/103
600/587
(Continued)

FOREIGN PATENT DOCUMENTS

JP 2007-139566 A 6/2007
JP 2009-85812 A 4/2009
(Continued)

OTHER PUBLICATIONS

International Search Report and Written Opinion mailed on May 25, 2021, received for PCT Application PCT/JP2021/010189, filed on Mar. 12, 2021, 10 pages including English Translation.
(Continued)

Primary Examiner — Thang X Le
(74) Attorney, Agent, or Firm — XSENSUS LLP

(57) ABSTRACT

According to one embodiment, a sensor device comprises a substrate, and a sensor layer superposed on the substrate, the substrate includes a plurality of individual areas arranged in a matrix in a first direction and a second direction that intersect each other, a plurality of individual electrodes arranged in the plurality of individual areas, and a common electrode facing the plurality of individual electrodes and generating a plurality of electric fields between the plurality of individual electrodes, wherein the plurality of electric fields are in different directions in a planar view, and the plurality of electric fields in different directions are applied to the sensor layer.

7 Claims, 24 Drawing Sheets

(58) Field of Classification Search
CPC ... G01B 7/20; G01B 7/22; G01B 7/28; G01B 7/287; G01L 5/00; G01L 5/1623; G01L 5/165

See application file for complete search history.

(56) References Cited

U.S. PATENT DOCUMENTS

| | | | |
|---|---|---|---|
| 2009/0084190 A1* | 4/2009 | Sugahara | G01N 3/20 73/849 |
| 2010/0033196 A1 | 2/2010 | Hayakawa et al. | |
| 2017/0115799 A1* | 4/2017 | Shih | G06F 3/041 |
| 2017/0191819 A1 | 7/2017 | O'Brien et al. | |
| 2018/0088708 A1* | 3/2018 | Naganuma | G06F 3/0414 |
| 2019/0102019 A1* | 4/2019 | Nakanishi | G02F 1/13338 |
| 2019/0376852 A1* | 12/2019 | Kobayashi | B32B 23/20 |
| 2020/0341588 A1* | 10/2020 | Huang | G06F 3/0445 |
| 2022/0164054 A1* | 5/2022 | Kurasawa | G06F 3/04166 |

FOREIGN PATENT DOCUMENTS

| | | |
|---|---|---|
| JP | 2010-43881 A | 2/2010 |
| JP | 2017-527830 A | 9/2017 |
| WO | 2016/208560 A1 | 12/2016 |

OTHER PUBLICATIONS

Chinese Office Action issued Mar. 27, 2025, in CN Application No. 202180024222.5, 19pp.

* cited by examiner

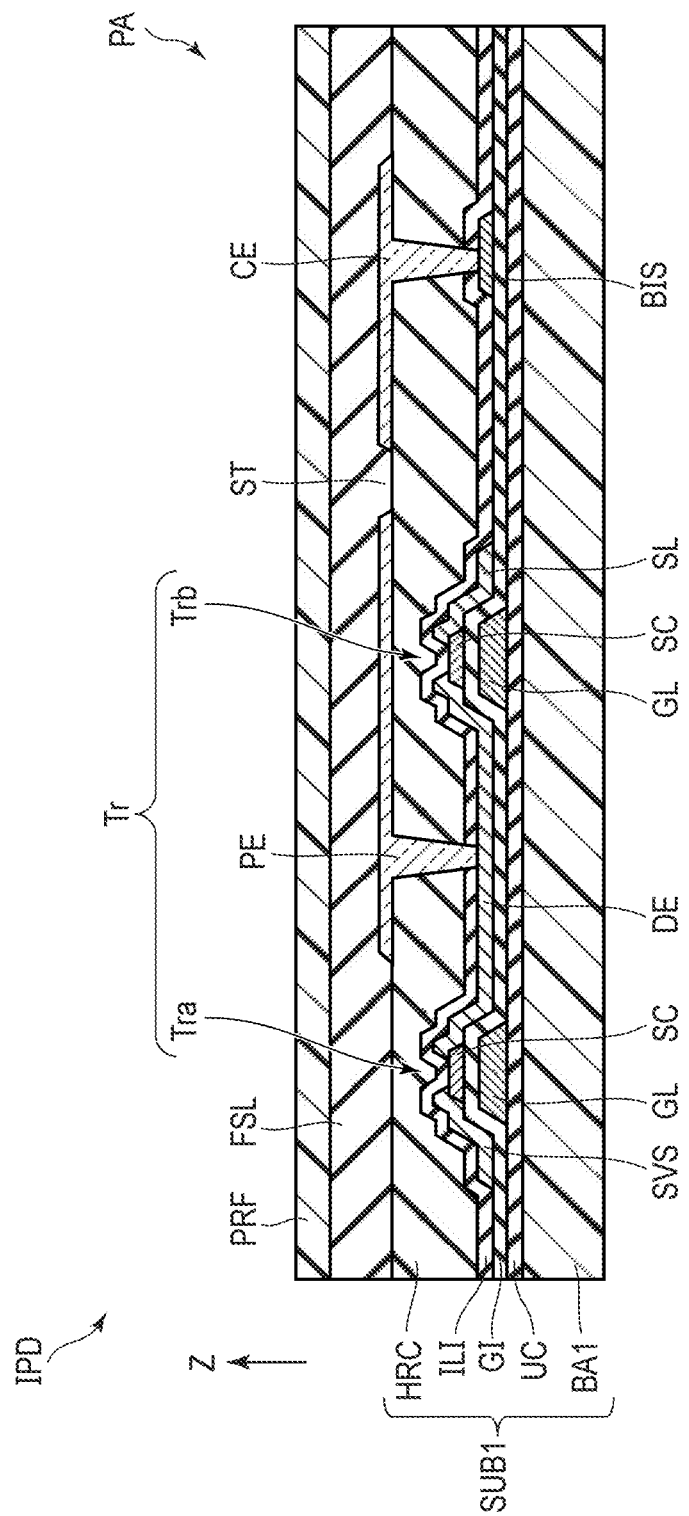
F I G. 5

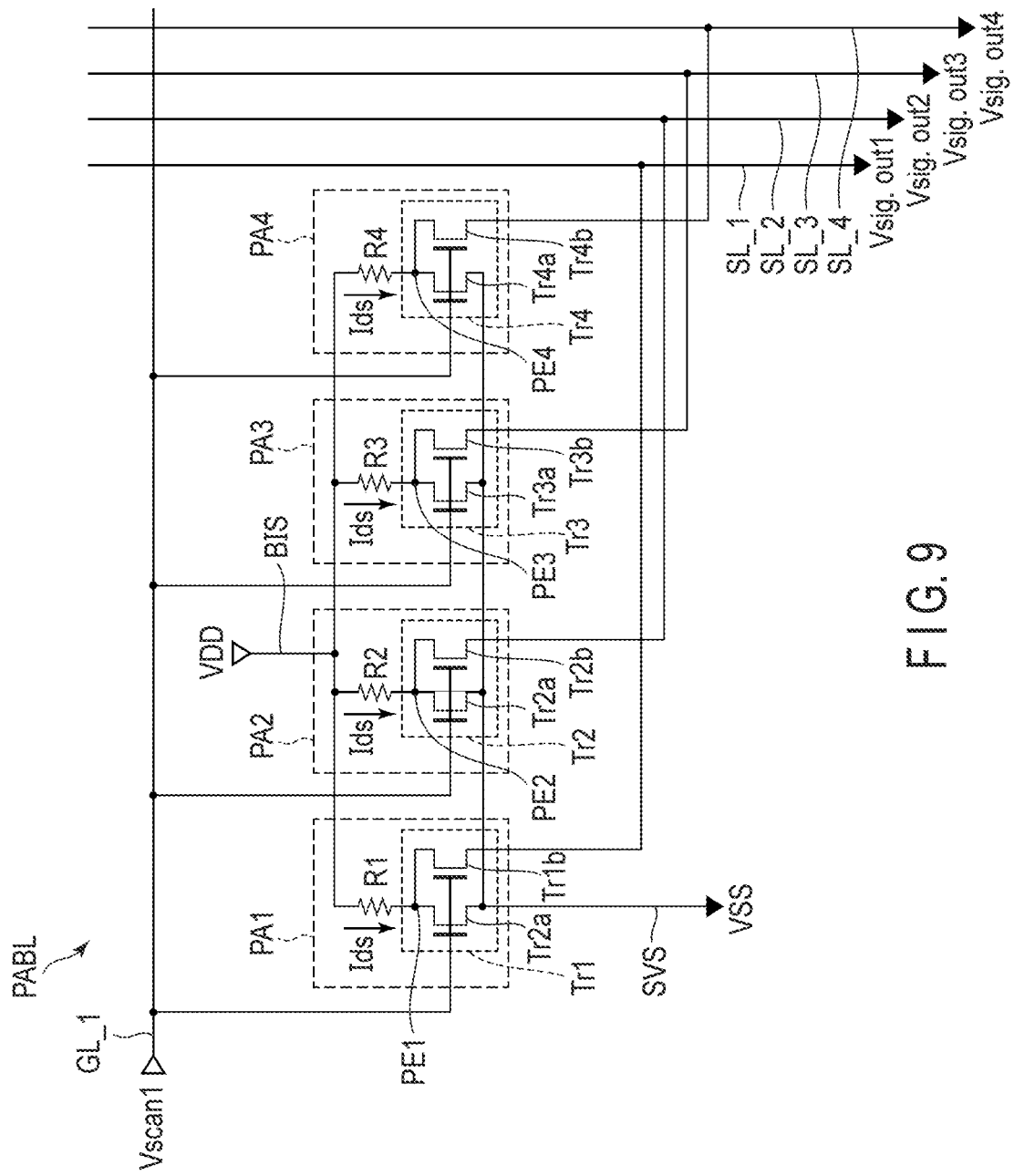
F I G. 9

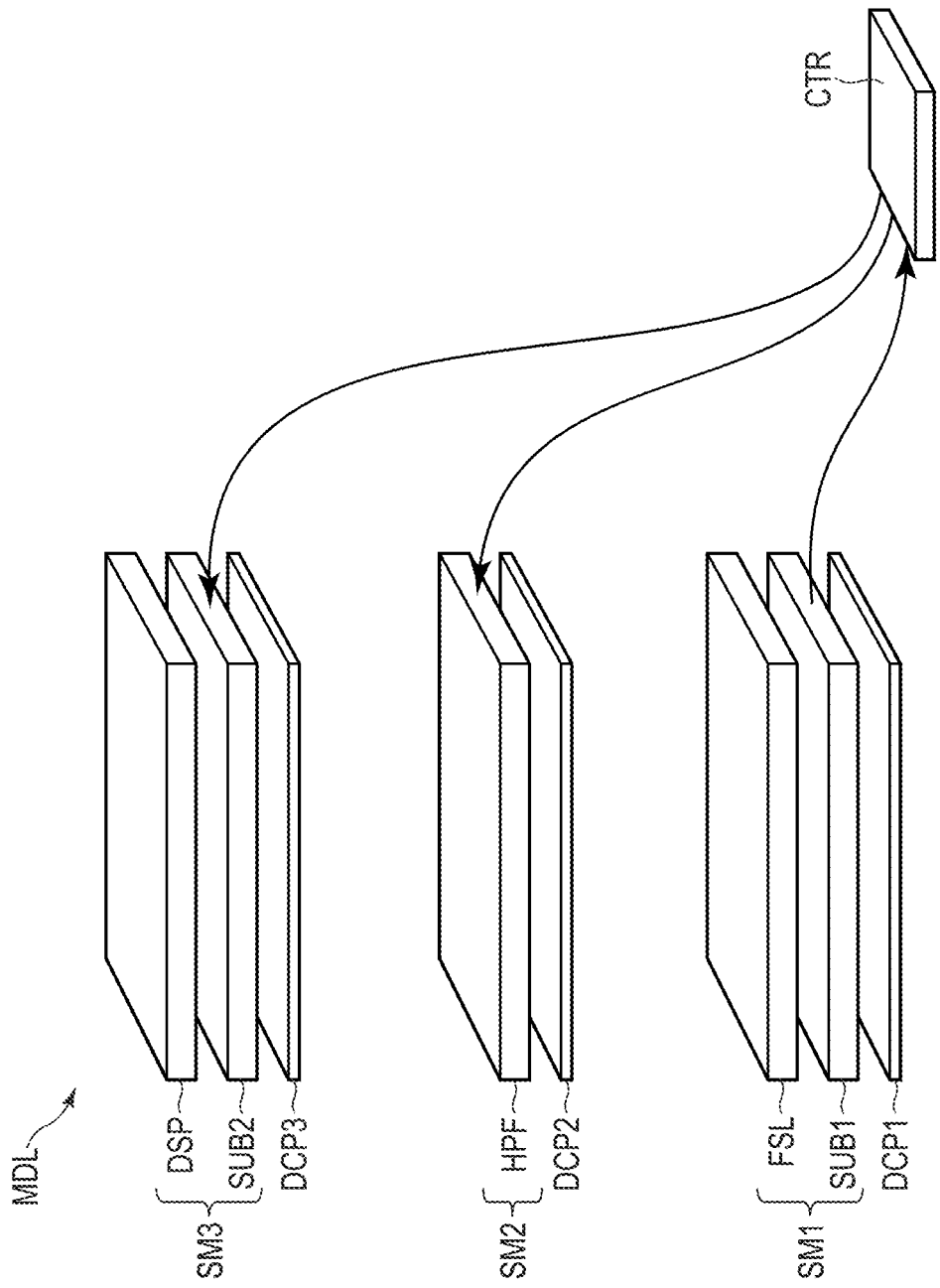
F I G. 21

SENSOR DEVICE AND MODULE

CROSS-REFERENCE TO RELATED APPLICATIONS

This application is a Continuation Application of PCT Application No. PCT/JP2021/010189, filed Mar. 12, 2021, and based upon and claiming the benefit of priority from Japanese Patent Application No. 2020-054361, filed Mar. 25, 2020, the entire contents of all of which are incorporated herein by reference.

FIELD

Embodiments described herein relate generally to a sensor devices and modules.

BACKGROUND

A sensor device capable of detecting the unevenness, etc., of an object to be measured as a surface pressure distribution is known.

BRIEF DESCRIPTION OF THE DRAWINGS

FIG. 5 is a cross-sectional view of an individual area.
FIG. 9 shows a circuit configuration of an individual area block in the configuration example.
FIG. 21 is a schematic view showing a configuration of an example of the module shown in FIG. 19.

DETAILED DESCRIPTION

Figure 1A:
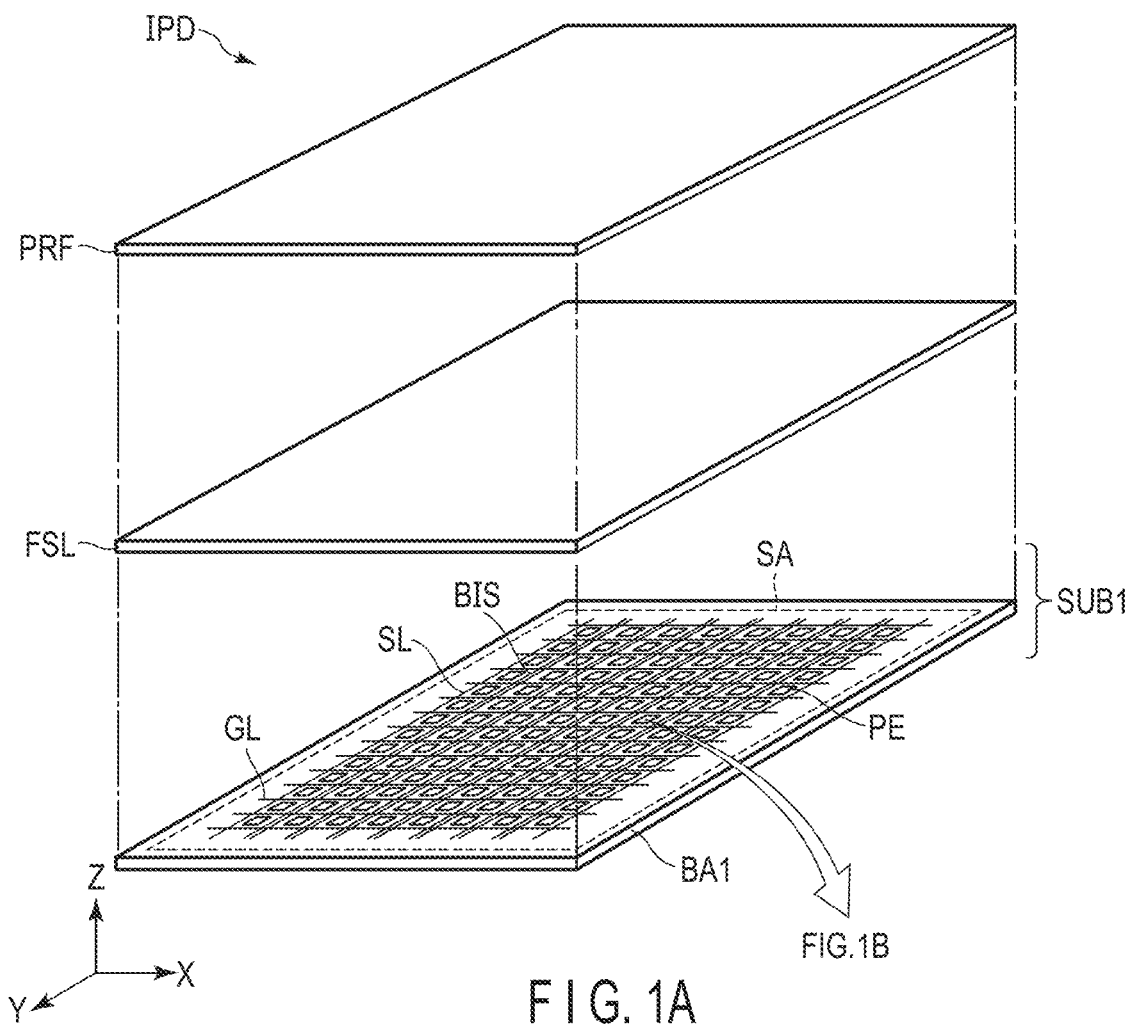
FIG. 1A shows a sensor device of Embodiment 1.

In general, according to one embodiment, a sensor device comprises a substrate; and a sensor layer superposed on the substrate, the substrate including: a plurality of individual areas arranged in a matrix in a first direction and a second direction that intersect each other; a plurality of individual electrodes arranged in the plurality of individual areas; and a common electrode facing the plurality of individual electrodes and generating a plurality of electric fields between the plurality of individual electrodes, wherein the plurality of electric fields are in different directions in a planar view, and the plurality of electric fields in different directions are applied to the sensor layer.

According to another embodiment, a module comprises a plurality of sub-modules, one of the plurality of sub-modules comprising: a substrate; and a sensor layer superposed on the substrate, the substrate including: a plurality of individual areas arranged in a matrix in a first direction and a second direction that intersect each other; a plurality of individual electrodes arranged in the plurality of individual areas; and a common electrode facing the plurality of individual electrodes and generating a plurality of electric fields between the plurality of individual electrodes, wherein the plurality of electric fields are in different directions in a planar view, and the plurality of electric fields in different directions are applied to the sensor layer.

The present embodiment provides a sensor device capable of reconstructing, that is, detecting, a three-dimensional self-shape by simultaneously detecting the direction and amount of stress that is applied.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

A sensor device according to an embodiment will now be described in detail with reference to accompanying drawings.

In this embodiment, a first direction X, a second direction Y, and a third direction Z are orthogonal to each other, but they may intersect at an angle other than 90°. In the following descriptions, a direction forwarding a tip of an arrow indicating the third direction Z is referred to as upward or downward and a direction forwarding oppositely from the tip of the arrow is referred to as downward or upward.

With such expressions "a second member above a first member" and "a second member below a first member", the second member may be in contact with the first member or may be remote from the first member. In the latter case, a third member may be interposed between the first member and the second member. On the other hand, with such expressions "a second member on a first member" and "a second member on a first member", the second member is meant to be in contact with the first member.

In addition, it is assumed that there is an observation position to observe the sensor device on a tip side of an arrow in a third direction Z, and viewing from this observation position toward the X-Y plane defined by the first direction X and the second direction Y is referred to as a planar view. Viewing a cross section of the sensor device in an X-Z plane defined by the first direction X and the third direction Z or a Y-Z plane defined by the second direction Y and the third direction Z is referred to as a cross-sectional view.

Embodiment 1

Figure 1B:
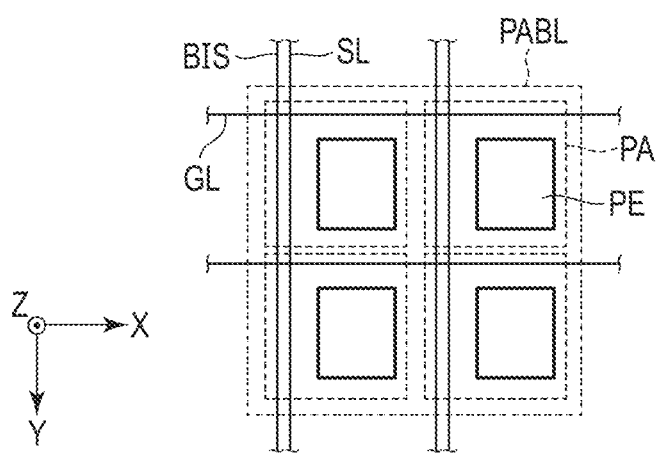
FIG. 1B shows the sensor device of Embodiment 1.

FIG. 1A and FIG. 1B show a sensor device of the present embodiment. FIG. 1A is an exploded perspective view showing the sensor device of the present embodiment. FIG. 1B is a plan view showing one individual area block PABL of FIG. 1A.

A sensor device IPD shown in FIG. 1A includes a substrate SUB1, a sensor layer FSL, and a protective layer PRF. The sensor layer FSL is superposed on the substrate SUB1 in a planar view. The substrate SUB1 includes, on a base material BA1, a scanning line GL, a signal line SL, a bias line BIS, and an individual electrode PE in the third direction Z.

The scanning lines GL extend in the first direction X and are arranged side by side in the second direction Y. The signal lines SL extend in the second direction Y and are arranged side by side in the first direction. The bias lines BIS extend in the second direction Y and are arranged side by side in the first direction. The individual electrode PE is arranged in an area partitioned by two signal lines SL and two scan lines GL.

As shown in FIG. 1A and FIG. 1B, the substrate SUB1 includes a plurality of individual areas PA arranged in a matrix along the first direction X and the second direction Y. Each of the plurality of individual areas PA includes one scanning line GL, one signal line SL, one bias line BIS, and one individual electrode PE. In the present embodiment, four individual areas PA (individual areas PA1, PA2, PA3, and PA4, which will be described later) are considered as one individual area block PABL.

The individual electrode PE and a common electrode CE provided in each of the individual areas PA are electrically connected to the sensor layer FSL on the substrate SUB1. The protective layer PRF is provided over the sensor layer FSL. Details of the individual electrode PE and the sensor layer FSL are described below.

Figure 2A:
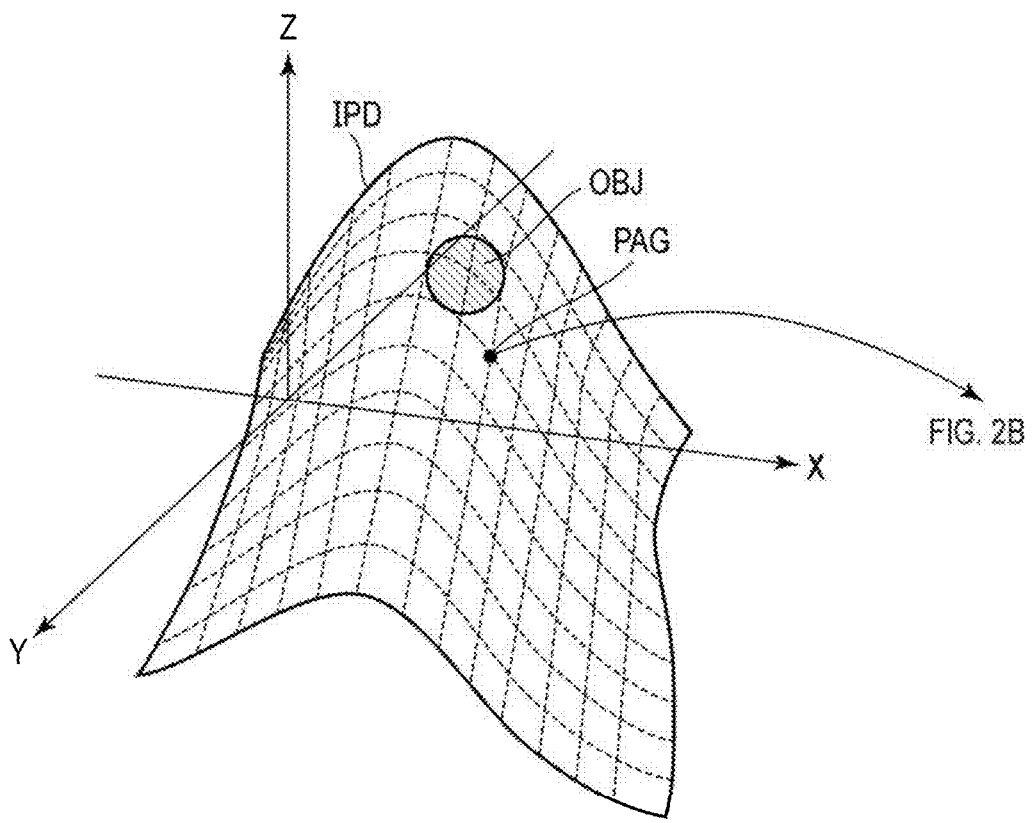
FIG. 2A illustrates an aspect of the sensor device being bent.
Figure 2B:
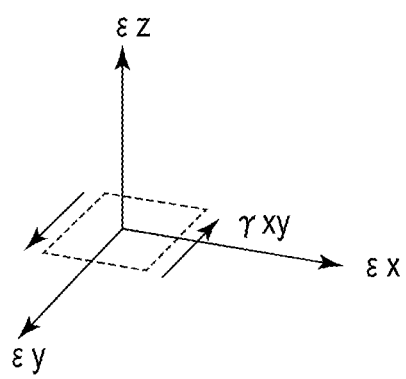
FIG. 2B illustrates an aspect of the sensor device being bent.

FIG. 2A and FIG. 2B illustrate an aspect of the sensor device being bent. FIG. 2A is a perspective view showing an aspect of the sensor device IPD being bent. The sensor device IPD may be bent along an object. FIG. 2B shows three components ($\varepsilon x$, $\varepsilon y$, and $\gamma xy$) of the X-Y plane in each of the individual area blocks PABL.

When the sensor device IPD is bent as shown in FIG. 2A, stress is applied to the sensor layer FSL corresponding to the individual area block PABL of the substrate SUB1.

Expansion and contraction stress $\sigma$ relating to a member is expressed as $\sigma = E \times \varepsilon$, where E is an expansion and contraction elastic modulus (longitudinal elastic modulus), and $\varepsilon$ is distortion. In other words, stress $\sigma$ is proportional to distortion $\varepsilon$. Furthermore, shear stress $\tau$ is expressed as $\tau = G \times \gamma$, where G is a shear elastic modulus (transverse elastic modulus), and $\gamma$ is distortion. Stress $\tau$ is proportional to distortion $\gamma$.

Therefore, by detecting the direction and amount of distortion $\varepsilon$, the sensor device IPD can measure its own three-dimensional shape, or, in a case where it is attached to an object OBJ, a three-dimensional shape of the OBJ.

As shown in FIG. 2B, the direction and amount of distortion $\varepsilon$ are obtained by measuring the three components ($\varepsilon x$, $\varepsilon y$, and $\gamma xy$) of the X-Y plane in each of the individual area blocks PABL. Here, $\varepsilon x$ and $\varepsilon y$ denote an expansion and contraction distortion in the first direction X and an expansion and contraction distortion in the second direction Y, respectively. $\gamma xy$ denotes shear distortion in the X-Y plane.

Figure 3A:
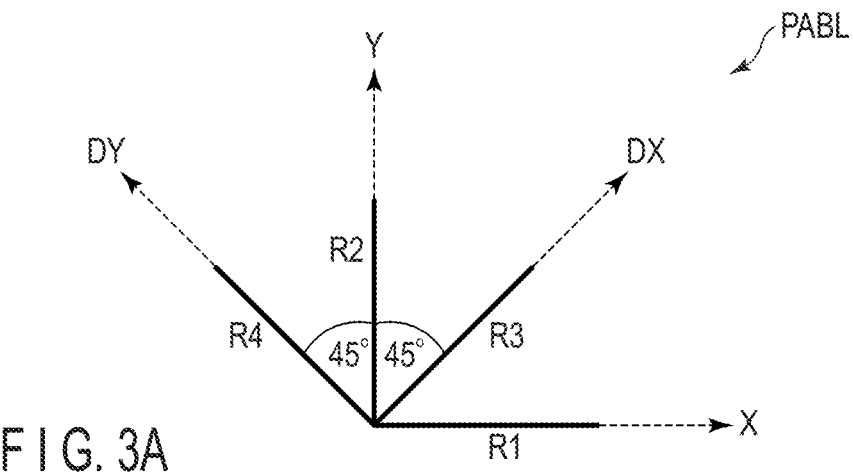
FIG. 3A illustrates distortion.

FIG. 3A to FIG. 3D illustrate the distortion. FIG. 3A shows a basic configuration of the individual area block PABL of the present embodiment.

First, in FIG. 3A, a direction intersecting at an acute angle $\theta$ clockwise to the second direction Y is defined as a fourth direction DX, and a direction intersecting at an acute angle $\theta$ counterclockwise to the second direction Y is defined as a fifth direction DY. The acute angle $\theta$ is, for example, 45°. In a case where the acute angle $\theta$ is 45°, the fourth direction DX and the fifth direction DY are perpendicular to each other.

The first direction X, the second direction Y, the fourth direction DX, and the fifth direction DY are directions that intersect each other in the X-Y plane. Note that, in a case of discussing only the X-Y plane, the third direction Z is excluded and the first direction X, the second direction Y, the fourth direction DX, and the fifth direction DY may be referred to as the first direction, the second direction, the third direction, and the fourth direction, respectively.

The first direction X, the second direction Y, the fourth direction DX, and the fifth direction DY are different directions from each other in the X-Y plane, i.e., in a planar view.

The individual area block PABL includes a resistor R1 that measures the distortion in the first direction X, a resistor R2 that measures the distortion in the second direction Y, a resistor R3 that measures the distortion in the fourth direction DX, and a resistor R4 that measures the distortion in the fifth direction DY. Resistors R1 to R4 correspond to the sensor layer FSL.

The amounts of change $\Delta R1$ and $\Delta R2$ in the resistance values in the first direction X and the second direction Y correspond to the expansion and contraction distortion EX in the first direction X and the expansion and contraction distortion $\varepsilon y$ in the second direction Y, respectively. The amount of change $\Delta R3$ or $\Delta R4$ in the resistance value in the fourth direction DX and the fifth direction DY corresponds to the shear distortion $\gamma xy$ in the X-Y plane.

Note that the shear distortion $\gamma xy$ should be obtained from the measurement of at least one of the fourth direction DX and the fifth direction DY, and both need not be measured necessarily.

Figure 3B:
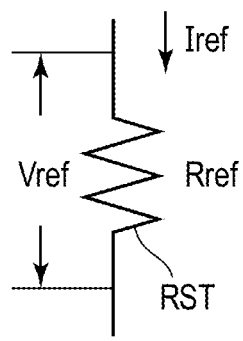
FIG. 3B illustrates distortion.
Figure 3C:
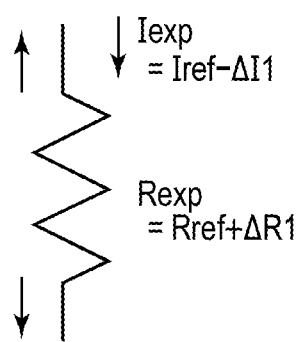
FIG. 3C illustrates distortion.
Figure 3D:
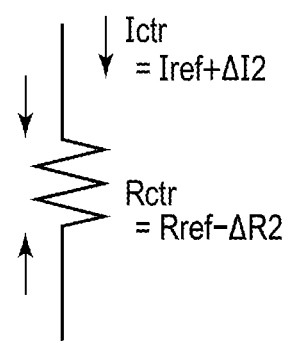
FIG. 3D illustrates distortion.

Here, a distortion sensor using resistors is described. FIG. 3B to FIG. 3D are schematic views showing the principle of the distortion sensor.

First, as a reference state, as shown in FIG. 3B, a current value when voltage Vref is applied to a resistor RST with a resistance value Rref is referred to as a current value Iref. Note that, in the sensor device IPD of the present embodiment, in principle, a resistance value in a planar state where no distortion occurs is referred to as the resistance value Rref in the reference state.

As shown in FIG. 3C, when tensile stress is applied to the resistor RST, the resistance value of the resistor RST increases (see FIG. 3C). If the resistance value when the tensile stress is applied is a resistance value Rexp, and the resistance value for the increase is ΔR1, Rexp=Rref+ΔR1 is expressed. Also, since the resistance value increases, the current value of the resistor RST decreases and becomes a current value Iexp. If the decrease in the current value is ΔI1, Iexp=Iref−ΔI1 is expressed.

On the other hand, as shown in FIG. 3D, when compressive stress is applied to the resistor RST, the resistance value of the resistor RST decreases. If the resistance value when the compressive stress is applied is a resistance value Rctr, and the resistance value for the decrease is ΔR2, Rctr=Rref−ΔR2 is expressed. Also, since the resistance value decreases, the current value of the resistor RST increases and becomes a current value Ictr. If the increase in current value is ΔI2, Ictr=Iref+ΔI2 is expressed.

As shown in FIG. 3B to FIG. 3D, the amount of change in the resistance value can be calculated by measuring the amount of change in the current value. That is, the amount of change in the resistance values of the resistors R1 to R4 shown in FIG. 3A is obtained by measuring the amount of change in the current flowing therethrough, respectively. Alternatively, it is possible to detect the amount of change in the resistance value by converting the amount of change in the current into the amount of change in a voltage and measuring the amount of change in the voltage.

Figure 4:
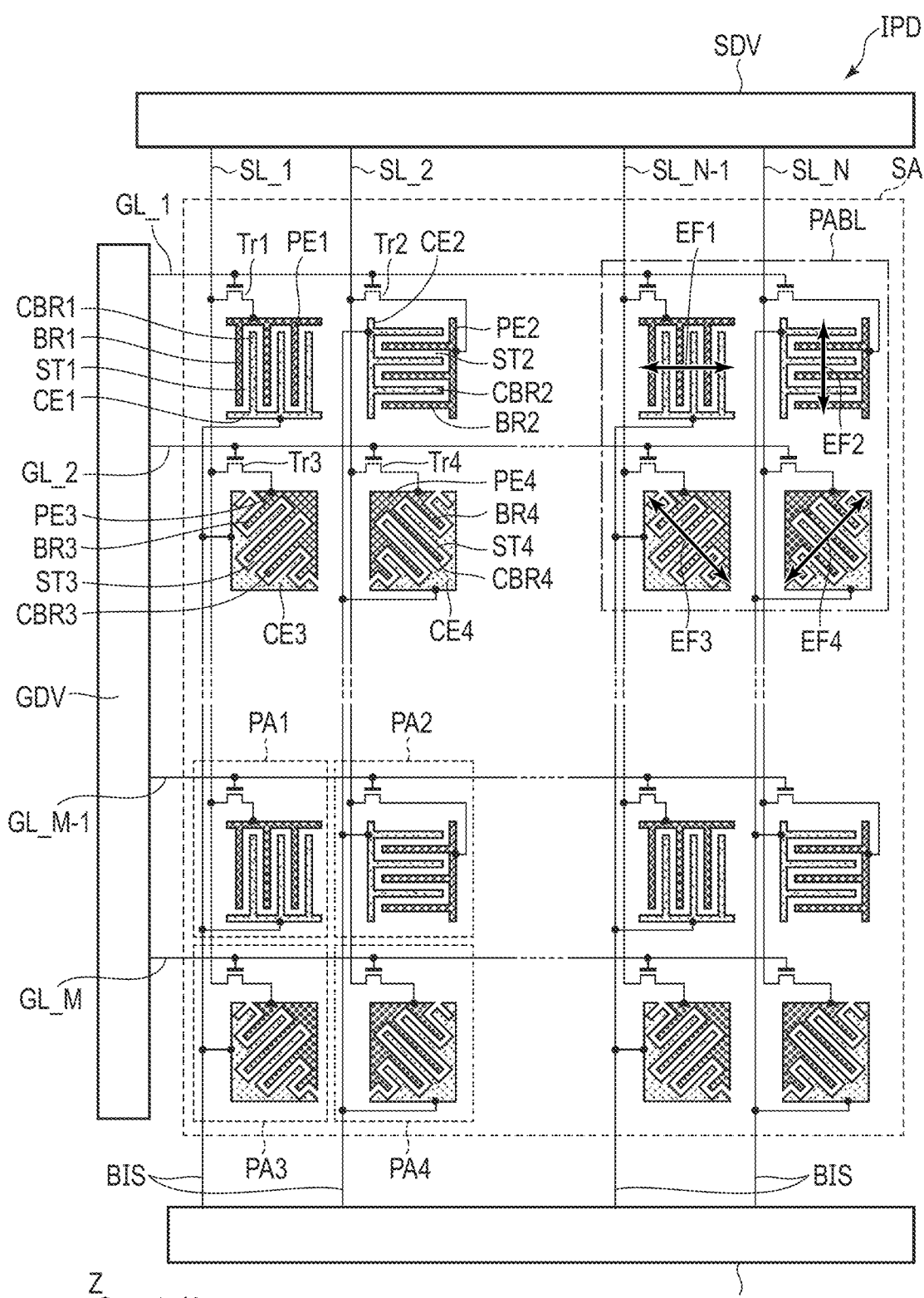
FIG. 4 is a schematic plan view of the sensor device.

FIG. 4 is a schematic plan view of the sensor device IPD. In FIG. 4, details of a planar configuration of a transistor Tr are omitted. The sensor device IPD shown in FIG. 4 includes M scanning lines GL_1 to GL_M and N signal lines SL_1 to SL_N (where M and N are natural numbers).

The scanning lines GL are connected to a scanning line drive circuit GDV. The signal lines SL are connected to a signal line drive circuit SDV. The bias lines BIS are connected to a bias drive circuit BDV. The details will be described later, but the scanning line drive circuit GDV applies a signal Vscan to the scanning lines GL. At the signal line drive circuit SDV, a signal Vsig.out is output from the signal line SL. Furthermore, the bias drive circuit BDV applies a power supply voltage VDD to the bias line BIS.

The sensor device IPD may also have a controller, which is not shown in the drawing. The controller is electrically connected to the scanning line drive circuit GDV, the signal line drive circuit SDV, and the bias drive circuit BDV, and controls each drive circuit.

Each of a plurality of individual area blocks PABL is provided with an individual area PA1, an individual area PA2, an individual area PA3, and an individual area PA4. Note that the individual area PA1, the individual area PA2, the individual area PA3, and the individual area PA4 are also referred to as a first individual area, a second individual area, a third individual area, and a fourth individual area, respectively.

In FIG. 4, the individual area PA1 is located in the mth row and nth column of a sensor area SA, the individual area PA2 is located in the mth row and (n+1)th column, the individual area PA3 is located in the (m+1)th row and nth column, and the individual area PA4 is located in the (m+1)th row and (n+1)th column (where m is a natural number between 1 and (M−1) and n is a natural number between 1 and (N−1)).

In other words, the individual areas PA1 to PA4 are arranged in a square pixel array aspect. Yet, in other words, the individual areas PA1 to PA4 are arranged every two areas in the first direction X and every two areas in the second direction Y.

However, the arrangement of individual areas PA1 to PA4 is not limited to the above. In FIG. 4, the individual area PA1 and the individual area PA2 are adjacent in the first direction X. Also, the individual area PA1 and the individual area PA3 are adjacent in the second direction Y. However, it may be the individual area PA3 or the individual area PA4 that is adjacent to the individual area PA1 in the first direction X. Also, it may be the individual area PA2 or the individual area PA4 that is adjacent to the individual area PA1 in the second direction Y.

The arrangement of the individual areas PA1 to PA4 in the individual area block PABL can be changed as needed.

The individual area PA1 includes a transistor Tr1 and an individual electrode PE1. The individual electrode PE1 includes a plurality of linear electrodes BR1 extending in the second direction Y. The individual area PA1 includes a common electrode CE1 facing the individual electrode PE1. The common electrode CE1 includes a plurality of linear electrodes CBR1 extending in the second direction Y. The plurality of linear electrodes BR1 and the plurality of linear electrodes CBR1 are each arranged facing each other across a slit ST1.

The individual area PA2 includes a transistor Tr2 and an individual electrode PE2. The individual electrode PE2 includes a plurality of linear electrodes BR2 extending in the first direction X. The individual area PA2 includes a common electrode CE2 facing the individual electrode PE2. The common electrode CE2 includes a plurality of linear electrodes CBR2 extending in the first direction X. The plurality of linear electrodes BR2 and the plurality of linear electrodes CBR2 are each arranged facing each other across a slit ST2.

The individual area PA3 includes a transistor Tr3 and an individual electrode PE3. The individual electrode PE3 includes a plurality of linear electrodes BR3 extending in the fifth direction DY. The individual area PA3 includes a common electrode CE3 facing the individual electrode PE3. The common electrode CE3 includes a plurality of linear electrodes CBR3 extending in the fifth direction DY. The plurality of linear electrodes BR3 and the plurality of linear electrodes CBR3 are each arranged facing each other across a slit ST3.

The individual area PA4 includes a transistor Tr4 and an individual electrode PE4. The individual electrode PE4 includes a plurality of linear electrodes BR4 extending in the fourth direction DX. The individual area PA4 includes a common electrode CE4 facing the individual electrode PE4. The common electrode CE4 includes a plurality of linear electrodes CBR4 extending in the fourth direction DX. The plurality of linear electrodes BR4 and the plurality of linear electrodes CBR4 are each arranged facing each other across a slit ST4.

In other words, in the sensor device IPD shown in FIG. 4, the direction in which the linear electrodes BR of the individual electrodes PE extend and the direction in which the linear electrodes CBR of the common electrodes CE extend, arranged in one individual area PA, are the same.

In addition, among the individual areas PA arranged along the first direction X, the direction in which the linear electrodes BR and the linear electrodes CBR extend in an arbitrary individual area PA differs from the direction in which the linear electrodes BR and the linear electrodes CBR extend in an individual area PA adjacent to the arbitrary individual area PA in the first direction X.

In addition, among the individual areas PA arranged along the second direction, the direction in which the linear electrodes BR and the linear electrodes CBR extend in an arbitrary individual area PA differs from the direction in which the linear electrodes BR and the linear electrodes CBR extend in an individual area PA adjacent to the arbitrary individual area PA in the second direction.

More specifically, for example, the linear electrodes BR1 of the individual electrode PE1 and the linear electrodes CBR1 of the common electrode CE1 of the individual area PA1 extend in the second direction Y. In the individual area PA2, which is adjacent to the individual area PA1 in the first direction X, the linear electrodes BR2 and the linear electrodes CBR2 extend in the first direction X, which is different from the second direction Y.

Furthermore, in the individual area PA3, which is adjacent to the individual area PA1 in the second direction Y, the linear electrodes BR3 and the linear electrodes CBR3 extend in the fifth direction DY, which is different from the second direction Y.

The sensor device IPD shown in FIG. 4 has a configuration in which the individual electrode PE and the common electrode CE are provided in the same plane (same X-Y plane), which is an electrode configuration equivalent to that of pixels in so-called in-plane switching (IPS) type display devices. As described in detail below, both the individual electrode PE and the common electrode CE are provided in contact with an insulating layer HRC.

An electric field EF1, an electric field EF2, an electric field EF3, and an electric field EF4 are generated respectively between the individual electrode PE1 and the common electrode CE1, between the individual electrode PE2 and the common electrode CE2, between the individual electrode PE3 and the common electrode CE3, and between the individual electrode PE4 and the common electrode CE4.

The directions in which the electric fields EF1 to EF4 are generated are the first direction X, the second direction Y, the fourth direction DX, and the fifth direction DY, respectively. In other words, in the individual area block PABL, electric fields are generated in four different directions on the X-Y plane.

In the individual area PA1, the distortion (expansion and contraction) of the resistor R1 (sensor layer FSL) to which the electric field EF1 in the first direction X is applied is detected as the amount of change in the current value. In the individual area PA2, the distortion (expansion and contraction) of the resistor R2 (sensor layer FSL) to which the electric field EF2 in the second direction Y is applied is detected as the amount of change in the current value. In the individual area PA3, the distortion (shear) of the resistor R3 (sensor layer FSL) to which the electric field EF3 in the fourth direction DX is applied is detected as the amount of change in the current value. In the individual area PA4, the distortion (shear) of the resistor R4 (sensor layer FSL) to which the electric field EF4 in the fifth direction DY is applied is detected as the amount of change in the current value.

As described in detail below, each amount of change in the current value is detected as the amount of change in voltage.

Note that, in the sensor device IPD of the present embodiment, in a case where shear stress can be ignored, measurement may be performed only in the individual areas PA1 and PA2, or only the individual areas PA1 and PA2 may be provided.

FIG. 5 is a cross-sectional view of the individual area PA. In the individual area PA shown in FIG. 5, a transistor Tra includes, on the base material BA1, an insulating layer UC, a gate electrode (scanning line GL), an insulating layer GI, a semiconductor layer SC, an insulating layer ILI, a source electrode (power supply voltage line SVS) and drain electrode DE, the insulating layer HRC, and the individual electrode PE. These are stacked in this order in the third direction Z.

A transistor Trb includes, on the base material BA1, the insulating layer UC, the gate electrode (scanning line GL), the insulating layer GI, the semiconductor layer SC, the insulating layer ILI, the source electrode (signal line SL) and drain electrode DE, the insulating layer HRC, and the individual electrodes PE. These are stacked in this order in the third direction Z.

The individual area PA also includes, on the base material BA1, the insulating layer UC, the insulating layer GI, the bias line BIS, the insulating layer ILI, the insulating layer HRC, and the common electrode CE. These are stacked in this order in the third direction Z.

The individual electrode PE and the common electrode CE face each other in the same plane across the above-mentioned slit ST (slits ST1 to ST4), and, in FIG. 5, face each other on a boundary surface between the insulating layer HRC and the sensor layer FSL layer.

In FIG. 5, the individual electrode PE extends over the transistor Trb, but is not limited to this configuration. The individual electrode PE does not have to be superposed on the transistor Trb.

The signal line SL, the drain electrode DE, and the bias line BIS are configured by the same material. The individual electrode PE and the common electrode CE are configured by the same material.

Note that, in the present embodiment, layers formed by the same material and the same process are considered to be the same layer. The individual electrode PE and the common electrode CE are provided on the same layer.

The sensor layer FSL is arranged in contact with the individual electrode PE and the common electrode CE. The protective layer PRF is provided on the sensor layer FSL.

The sensor layer FSL is made of, for example, a pressure-sensitive material. The pressure-sensitive material includes an insulating resin and conductive particles. When extensional stress is applied, the pressure-sensitive material is elongated and deformed, the distance between conductive particles in the insulating resin decreases, and the electrical resistance of the sensor layer FSL decreases. When the stress is removed, the elasticity of the insulating resin restores the material to its shape before the stress was applied, and the electrical resistance returns to its original state. When contraction stress is applied, the pressure-sensitive material shrinks and deforms, the distance between the conductive particles in the insulating resin increases, and the electrical resistance of the sensor layer FSL increases. When the stress is removed, the elasticity of the insulating resin restores the material to its shape before the stress was applied, and the electrical resistance returns to its original state.

A flexible organic insulating material, e.g., polyimide, is used as the material of the base material BA1. The insulating layer UC, the insulating layer GI, and the insulating layer ILI are formed by, for example, inorganic insulating materials, specifically, silicon oxide (SiO) and silicon nitride (SiN). The insulating layer HRC is formed by organic insulating materials, specifically, acrylic and polyimide.

The semiconductor layer SC is formed by polycrystalline silicon such as low-temperature polycrystalline silicon, amorphous silicon, an oxide semiconductor, an organic semiconductor, etc.

The scanning line GL, the signal line SL, the drain electrode DE, and the bias line are formed by metallic materials such as Al (aluminum), Ti (titanium), Ag (silver), Mo (molybdenum), W (tungsten), Cu (copper), and Cr (chromium), or by such as an alloy combining these metal materials, and may have a single-layer structure or a multi-layer structure in which these metal materials or alloys are stacked.

The individual electrode PE and the common electrode CE may use the above metallic materials or alloys combining them, or may use translucent conductive materials, such as indium tin oxide (ITO) and indium zinc oxide (IZO).

Note that the sensor device IPD of the present embodiment includes the substrate SUB1, the sensor layer FSL, and the protective layer PRF. However, a module may be formed by stacking multiple sub-modules with these sub-modules as one sub-module. The module obtained by stacking sub-modules will be described in detail later.

Figure 6:
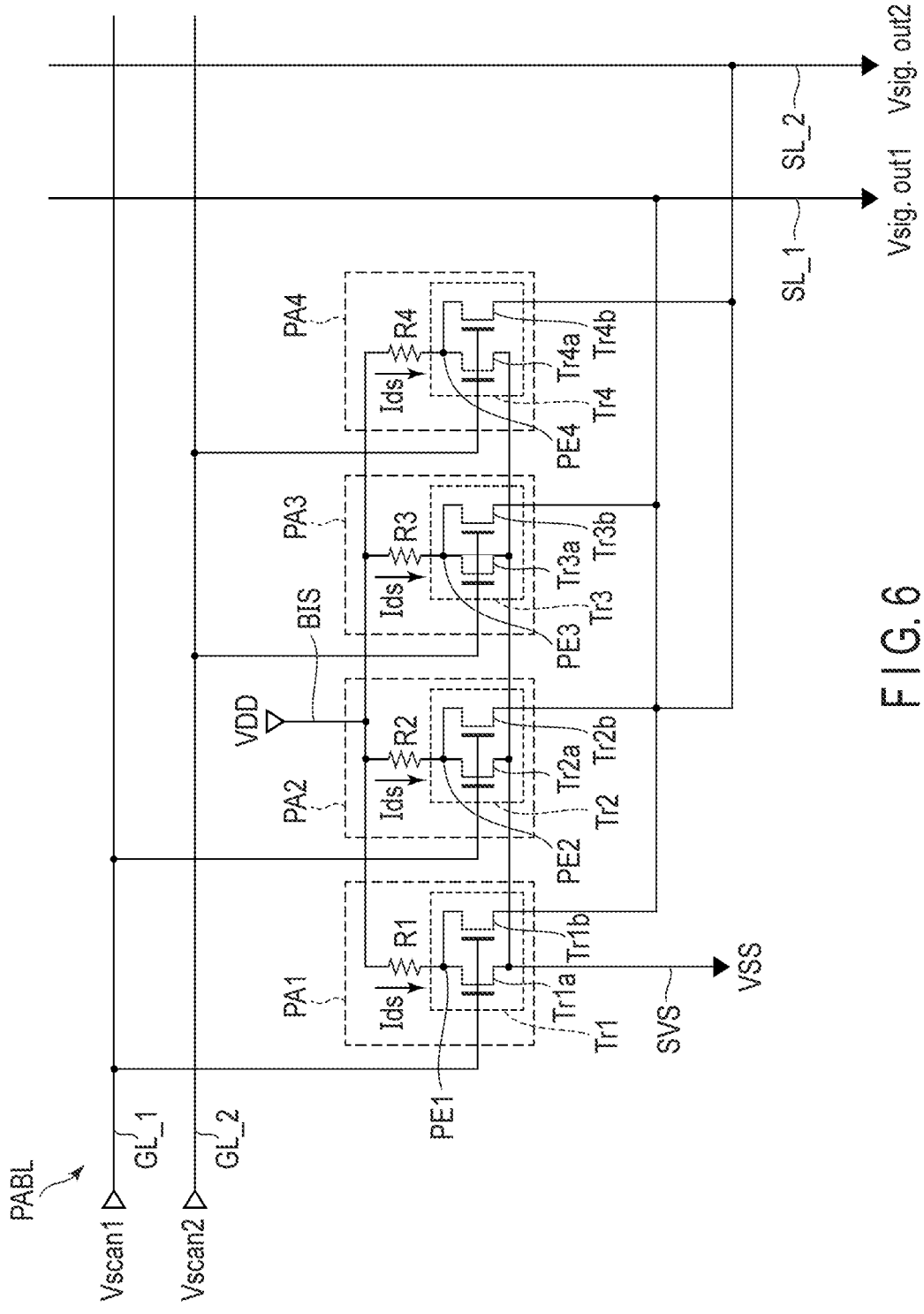
FIG. 6 shows a circuit configuration of an individual area block.

FIG. 6 shows a circuit configuration of the individual area block PABL. In the individual area block PABL shown in FIG. 6, as an example, the individual areas PA at the first row and first column, the first row and second column, the second row and first column, and the second row and second column are respectively shown as the individual area PA1, the individual area PA2, the individual area PA3, and the individual area PA4. However, the rows and columns are not limited to this.

The individual area PA1 includes transistors Tr1a and Tr1b as the transistor Tr1. A gate of the transistor Tr1a and a gate of the transistor Tr1b are both electrically connected to the scanning line GL_1. One of a source and a drain of the transistor Tr1a is electrically connected to the power supply voltage line SVS, and is applied a power supply voltage VSS. The other one of the source and the drain of the transistor Tr1a is electrically connected to the individual electrode PE1 and the other one of the source and the drain of the transistor Tr1b.

One of the source and the drain of the transistor Tr1b in the individual area PA1 is electrically connected to the signal line SL_1 and one of a source and a drain of a transistor Tr3b in the individual area PA3.

The individual electrode PE1 of the individual area PA1 is electrically connected to one of the terminals of the resistor R1 (sensor layer FSL).

The individual area PA2 includes transistors Tr2a and Tr2b as the transistor Tr2. A gate of the transistor Tr2a and a gate of the transistor Tr2b are both electrically connected to the scanning line GL_1. One of a source and a drain of the transistor Tr2a is electrically connected to the power supply voltage line SVS, and is applied the power supply voltage VSS. The other one of the source and the drain of the transistor Tr2a is electrically connected to the individual electrode PE2 and the other one of the source and the drain of the transistor Tr2b.

One of the source and the drain of the transistor Tr2b in the individual area PA2 is electrically connected to the signal line SL_2 and one of a source and a drain of a transistor Tr4b in the individual area PA4.

The individual electrode PE2 of the individual area PA2 is electrically connected to one of the terminals of the resistor R2 (sensor layer FSL).

The individual area PA3 includes transistors Tr3a and Tr3b as the transistor Tr3. A gate of the transistor Tr3a and a gate of the transistor Tr3b are both electrically connected to the scanning line GL_2. One of a source and a drain of the transistor Tr3a is electrically connected to the power supply voltage line SVS, and is applied the power supply voltage VSS. The other one of the source and the drain of the transistor Tr3a is electrically connected to the individual electrode PE3 and the other one of the source and the drain of the transistor Tr3b.

The individual electrode PE3 of the individual area PA3 is electrically connected to one of the terminals of the resistor R3 (sensor layer FSL).

The individual area PA4 includes transistors Tr4a and Tr4b as the transistor Tr4. A gate of the transistor Tr4a and a gate of the transistor Tr4b are both electrically connected to the scanning line GL_2. One of a source and a drain of the transistor Tr4a is electrically connected to the power supply voltage line SVS, and is applied the power supply voltage VSS. The other one of the source and the drain of the transistor Tr4a is electrically connected to the individual electrode PE4 and the other one of the source and the drain of the transistor Tr4b.

The individual electrode PE4 of the individual area PA4 is electrically connected to one of the terminals of the resistor R4 (sensor layer FSL).

The bias line BIS is electrically connected to the other one of the terminals of each of the resistor R1, the resistor R2, the resistor R3, and the resistor R4 (all sensor layers FSL), and is applied the power supply voltage VDD. Note that the power supply voltage VDD is higher than the power supply voltage VSS (VDD>VSS). Furthermore, the power supply voltage VSS may be, for example, a ground voltage GND.

In FIG. 6, signals Vscan1 and Vscan2 are applied to the scanning lines GL_1 and GL_2, respectively. Also, the signal lines SL_1 and SL_2 output signals Vsig.out1 and Vsig.out2, respectively. The amount of change in the output signals Vsig.out1 and Vsig.out2 corresponds to the amount of change in the voltage described above.

Figure 7A:
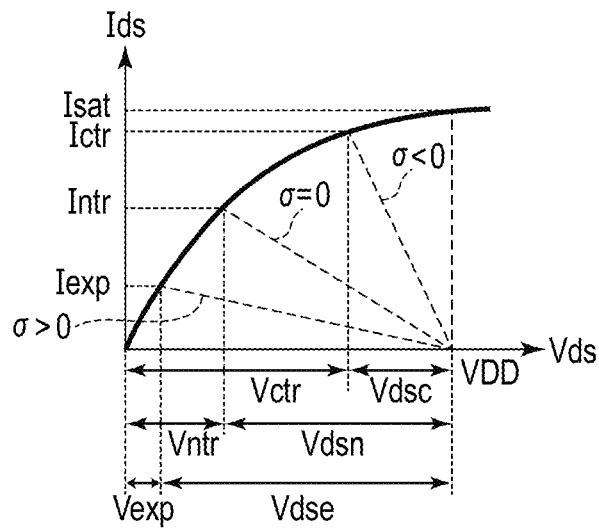
FIG. 7A illustrates stress detection.

FIG. 7A to FIG. 7E illustrate the detection of stress. FIG. 7A shows a source-to-drain voltage Vds of the transistor Tra and characteristics of a drain current Ids (Vds-Ids characteristics).

Figure 7B:
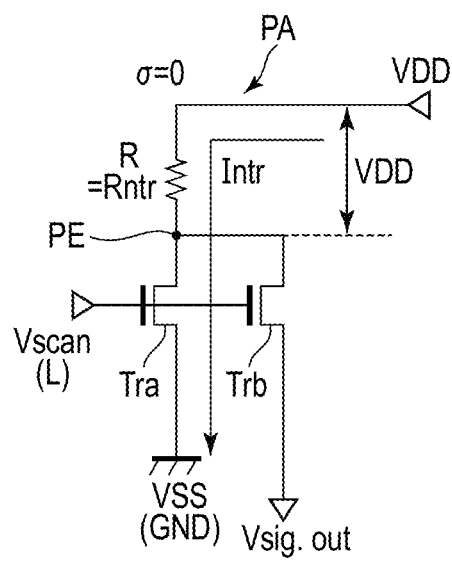
FIG. 7B illustrates stress detection.
Figure 7C:
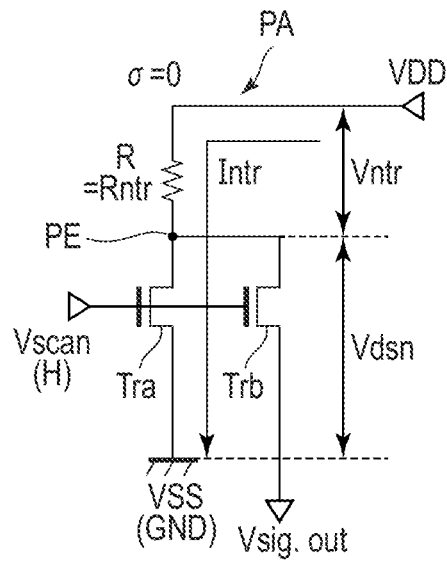
FIG. 7C illustrates stress detection.
Figure 7D:
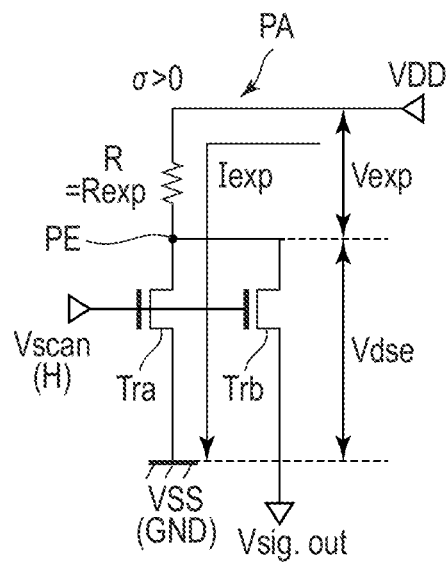
FIG. 7D illustrates stress detection.
Figure 7E:
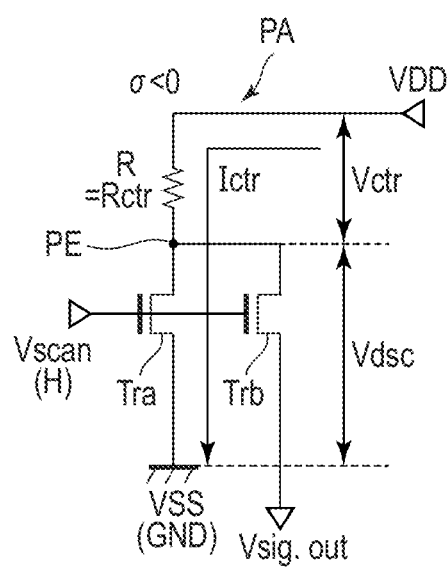
FIG. 7E illustrates stress detection.

Furthermore, FIG. 7B to FIG. 7E show a circuit configuration of the individual area PA. The individual area PA in FIG. 7B and FIG. 7C is assumed to have no stress applied (stress $\sigma=0$). The individual area PA in FIG. 7D is assumed to be applied tensile stress (stress $\sigma>0$). The individual area PA in FIG. 7E is assumed to be applied compressive stress (stress $\sigma<0$).

As shown in FIG. 7B, when the signal Vscan is at L (Low) level, both the transistor Tra and the transistor Trb become an off-state. Since the power supply voltage VDD is applied to one of the source and the drain of transistor Tra, the voltage of PE becomes VDD.

As shown in FIG. 7C, when the signal Vscan changes from L level to H (High) level, both the transistor Tra and the transistor Trb become an on-state. Since the signal line SL to which the transistor Trb is connected is a high-impedance input for voltage readout, a current Iexp all flows through the transistor Tra to the power supply voltage VSS. The amount of current flowing is determined by the sum of the resistance of the sensor layer FSL and an on-resistance of the transistor Tra. The voltage of the individual electrode PE is obtained by determining the difference between the power supply voltage (VDD-VSS) by the ratio between the resistance of the sensor layer and the on-resistance of the transistor Tra (a voltage drop in the sensor layer FSL in a case where a current defined by the resistance of the sensor layer and the on-resistance of the transistor Tra flows), and the voltage of this individual electrode PE is read out as Vsig.out by a voltage detector with high-impedance input connected to the signal line SL.

FIG. 7D shows the case where tensile stress is applied to the individual area PA as described above, and the signal Vscan is at H level.

In FIG. 7D, the resistance value of the resistor R is increased by ΔR1 compared to the case where no extensional stress is applied (FIG. 7C) and becomes resistance value Rexp (=Rntr+ΔR1).

At this time, the current value of the current flowing through the resistor R and the transistor Tra decreases by ΔI1 and becomes current value Iexp (=Intr−ΔI1). Since the current value flowing to the resistor R decreases, the voltage applied to both ends of the resistor R also decreases and becomes voltage Vexp (<voltage Vntr).

In other words, in a case where tensile stress is applied, a source-to-drain voltage Vdse of the transistor Tra is greater than voltage Vdsn (Vdse>Vdsn). This voltage Vdse is output as the signal Vsig.out via the signal line SL.

FIG. 7E shows the case where compressive stress is applied to the individual area PA as described above, and the signal Vscan is at H level.

In FIG. 7E, the resistance value of the resistor R is reduced by ΔR2 compared to the case where it is located in a neutral plane (FIG. 7C) and becomes resistance value Rctr (=Rntr−ΔR2).

At this time, the current value of the current flowing through the resistor R and the transistor Trb increases by ΔI2 and becomes current value Ictr (=Intr+ΔI2). Since the current value flowing to the resistor R increases, the voltage applied to both ends of the resistor R also increases and becomes voltage Vctr (>voltage Vntr).

A source-to-drain voltage Vgs of the transistor Trb in the on-state is considered to be voltage Vdsc. As in FIG. 7C, when Vscan is at H level, the combined voltage of the voltage Vctr applied to the resistor R and the source-to-drain voltage Vdsc of the transistor Trb is the power supply voltage VDD.

In other words, where compressive stress is applied, the source-to-drain voltage Vdse of the transistor Trb is smaller than the voltage Vdsn at the neutral plane (Vdsc<Vdsn). This voltage Vdse is output as signal Vsig.out via the signal line SL.

As described above, in the output signal Vsig.out, comparison with the voltage Vdsn at a reference neutral plane allows to detect whether the stress applied to the individual area PA including the transistor Trb is tensile stress or compressive stress, and the amount of stress thereof.

Note that, in the present embodiment, a sensor device including a distortion sensor using a resistor is described; however, it is not limited thereto. Instead of the distortion sensor using the resistor, for example, a sensor using electrostatic capacitance, a sensor using a piezoelectric element, etc., may also be used to form the sensor device.

The above-mentioned present embodiment can obtain a sensor device capable of simultaneously detecting the direction and amount of stress applied.

Configuration Example 1

Figure 8:
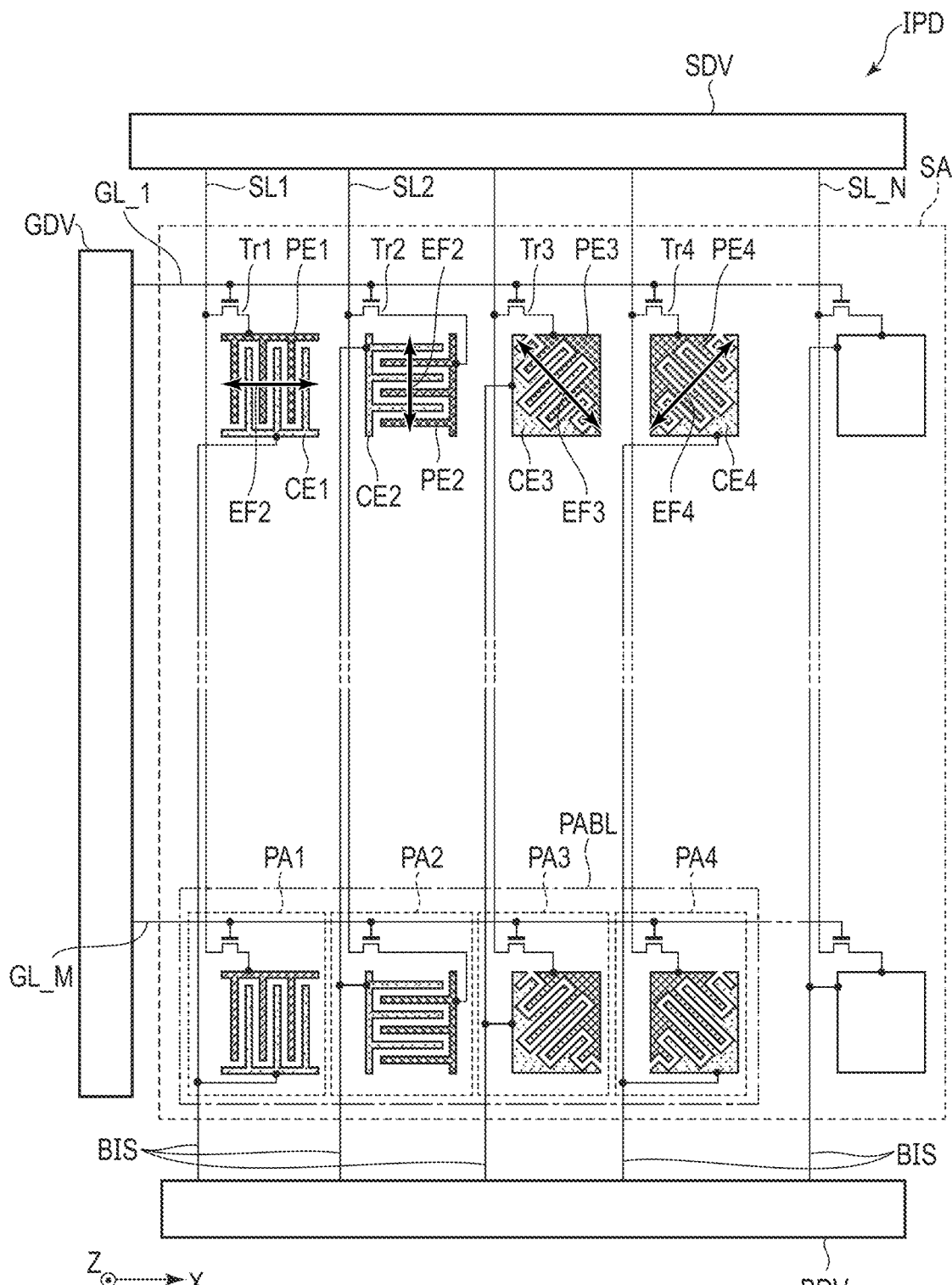
FIG. 8 is a plan view showing another configuration example of the sensor device in Embodiment 1.

FIG. 8 is a plan view showing another configuration example of the sensor device in the present embodiment. The configuration example shown in FIG. 8 differs from the configuration example shown in FIG. 4 in that the individual areas are arranged in a vertical stripe pixel array aspect.

In the sensor device IPD shown in FIG. 8, the individual area PA1 is located in the first to Mth rows and qth column of the sensor area SA, the individual area PA2 is located in the first to Mth rows and (q+1)th column, the individual area PA3 is located in the first to Mth rows and (q+2)th column, and the individual area PA4 is located in the first to Mth rows and (q+3)th column (where q is a natural number between one and (N−3)). That is, in the sensor device IPD shown in FIG. 8, the electric fields generated in the individual areas PA arranged along the second direction Y are in the same direction. On the other hand, in the individual areas PA arranged along the first direction X, the electric fields generated are in different directions.

In the sensor device IPD shown in FIG. 8, among the individual areas PA arranged along the second direction, the direction in which the linear electrodes BR and the linear electrodes CBR extend in an arbitrary individual area PA is the same as the direction in which the linear electrodes BR and the linear electrodes CBR extend in an individual area PA adjacent to the arbitrary individual area PA in the second direction Y.

In addition, among the individual areas PA arranged along the first direction X, the direction in which the linear electrodes BR and the linear electrodes CBR extend in an arbitrary individual area PA differs from the direction in which the linear electrodes BR and the linear electrodes CBR extend in an individual area PA adjacent to the arbitrary individual area PA in the first direction X.

More specifically, for example, the individual area PA1 adjacent in the second direction Y is the same individual area PA1. Therefore, in the individual areas PA1 adjacent in the second direction Y, the linear electrodes BR1 and linear electrodes CBR1 extend in the first direction X, which is the same direction.

In the individual area PA2 adjacent to the individual area PA1 in the first direction X, the linear electrodes BR2 and linear electrodes CBR2 extend in the first direction X, which is different from the second direction Y.

In other words, the individual areas PA1 to PA4 are arranged in a so-called vertical stripe pixel aspect. In addition, the individual areas PA1 to PA4 are each arranged side by side in the second direction Y, and are arranged every four areas in the first direction X.

FIG. 9 shows a circuit configuration of the individual area block PABL in the present configuration example. In the individual area block PABL shown in FIG. 9, as an example, the individual areas PA at the first row and first column, the first row and second column, the first row and third column, and the first row and fourth column are respectively shown as the individual area PA1, the individual area PA2, the individual area PA3, and the individual area PA4. However, the order of rows and columns is not limited to this.

The gate of the transistor Tr1a and the gate of the transistor Tr1b in the individual area PA1 are both electrically connected to the scanning line GL_1. One of the source and drain of the transistor Tr1b is electrically connected to the signal line SL_1.

The gate of the transistor Tr2a and the gate of the transistor Tr2b in the individual area PA2 are both electrically connected to the scanning line GL_1. One of the source and drain of the transistor Tr2b is electrically connected to a signal line SL_2.

The gate of the transistor Tr3a and the gate of the transistor Tr3b in the individual area PA3 are both electrically connected to the scanning line GL_1. One of the source and drain of the transistor Tr3b is electrically connected to a signal line SL_3.

The gate of the transistor Tr4a and the gate of the transistor Tr4b in the individual area PA4 are both electrically connected to the scanning line GL_1. One of the source and drain of the transistor Tr4b is electrically connected to a signal line SL_4.

Figure 10:
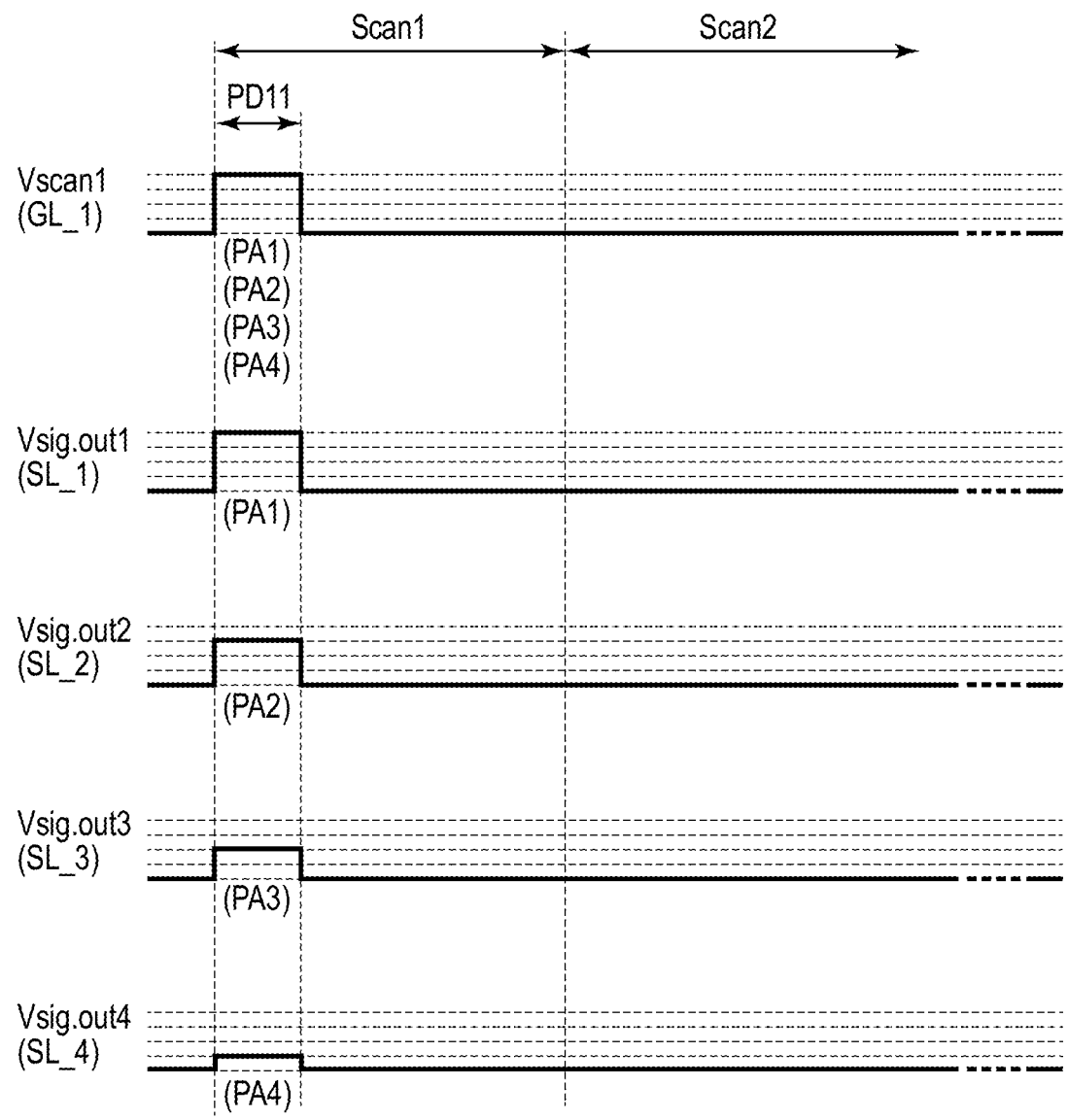
FIG. 10 is a timing chart of the individual area block.

FIG. 10 is a timing chart of the individual area block PABL. As shown in FIG. 10, the signal Vscan1 is input to the scanning line GL_1.

A drive period of an arbitrary scanning line GL is defined as period Scan_S (S is a natural number). Period Scan_1 is the drive period of the scanning line GL_1. In period Scan_1, the Vscan1 is H level at a period PD11, and is L level in all periods other than period PD11.

When stress is applied to the individual area block PABL, the resistance value of the sensor layer FSL changes as described above, and a voltage corresponding to the changed resistance value is output as the signal Vsig.out. The signal line SL_1 outputs a signal Vsig.out1, the signal line SL_2 outputs a signal Vsig.out2, the signal line SL_3 outputs a signal Vsig.out3, and the signal line SL_4 outputs a signal Vsig.out4.

In period PD11, the stress detected in the individual area PA1, the individual area PA2, the individual area PA3, and the individual area PA4 is output as the signal Vsig.out.

When period Scan_1 ends, the driving of the scanning line GL_2 starts. The drive period of the scanning line GL_2 is defined as period Scan_2. In this manner, all scanning lines GL of the sensor area SA are driven.

In the present configuration example, the same effect as the above-mentioned embodiment is achieved.

Configuration Example 2

Figure 11:
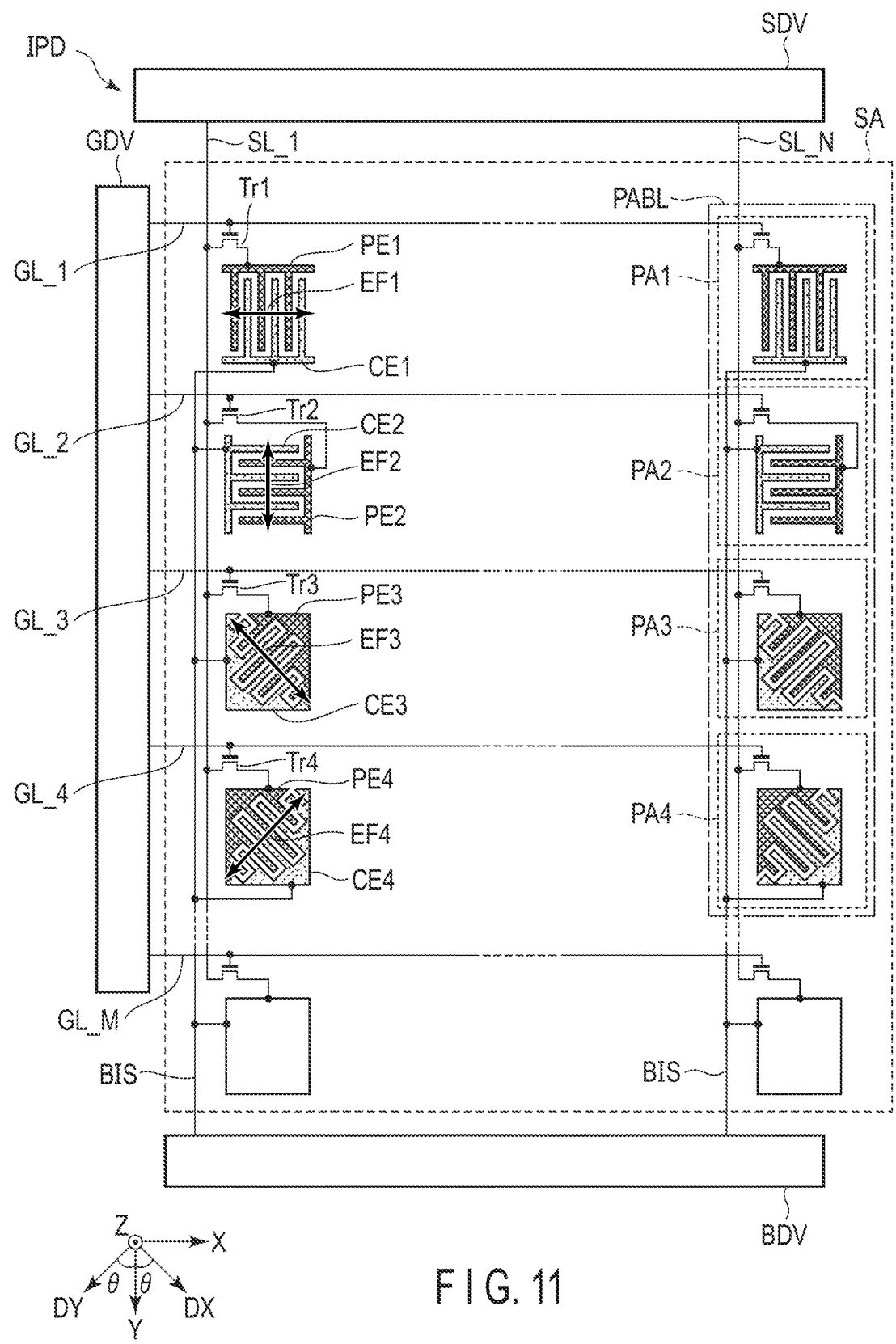
FIG. 11 is a plan view showing another configuration example of the sensor device in Embodiment 1.

FIG. 11 is a plan view of another configuration example of the sensor device in the present embodiment. The configuration example shown in FIG. 11 differs from the configuration example shown in FIG. 4 in that the individual areas are arranged in a horizontal stripe pixel array aspect.

In the sensor device IPD shown in FIG. 11, the individual area PA1 is located in the pth row and first to Nth columns of the sensor area SA, the individual area PA2 is located in (p+1)th row and first to Nth columns, the individual area PA3 is located in the (p+2)th row and first to Nth columns, and the individual area PA4 is located in the (p+3)th row and first to Nth columns (where p is a natural number between one and (M−3)). That is, in the sensor device IPD shown in FIG. 11, the electric fields generated in the individual areas PA arranged along the first direction X are in the same direction. On the other hand, in the individual areas PA arranged along the second direction Y, the electric fields generated are in different directions.

In the sensor device IPD shown in FIG. 11, among the individual areas PA arranged along the first direction X, the direction in which the linear electrodes BR and the linear electrodes CBR extend in an arbitrary individual area PA is the same as the direction in which the linear electrodes BR and the linear electrodes CBR extend in an individual area PA adjacent to the arbitrary individual area PA in the first direction X.

In addition, among the individual areas PA arranged along the second direction Y, the direction in which the linear electrodes BR and the linear electrodes CBR extend in an arbitrary individual area PA differs from the direction in which the linear electrodes BR and the linear electrodes CBR extend in an individual area PA adjacent to the arbitrary individual area PA in the second direction Y.

More specifically, for example, the individual area PA1 adjacent in the first direction X is the same individual area PA1. Therefore, in the individual areas PA1 adjacent in the first direction X, the linear electrodes BR1 and linear electrodes CBR1 extend in the second direction Y, which is the same direction.

In the individual area PA2 adjacent to the individual area PA1 in the second direction Y, the linear electrodes BR2 and linear electrodes CBR2 extend in the first direction X, which is different from the second direction Y.

In other words, the individual areas PA1 to PA4 are arranged in a so-called horizontal stripe pixel aspect. In addition, the individual areas PA1 to PA4 are each arranged side by side in the first direction X, and are arranged every four areas in the second direction Y.

Figure 12:
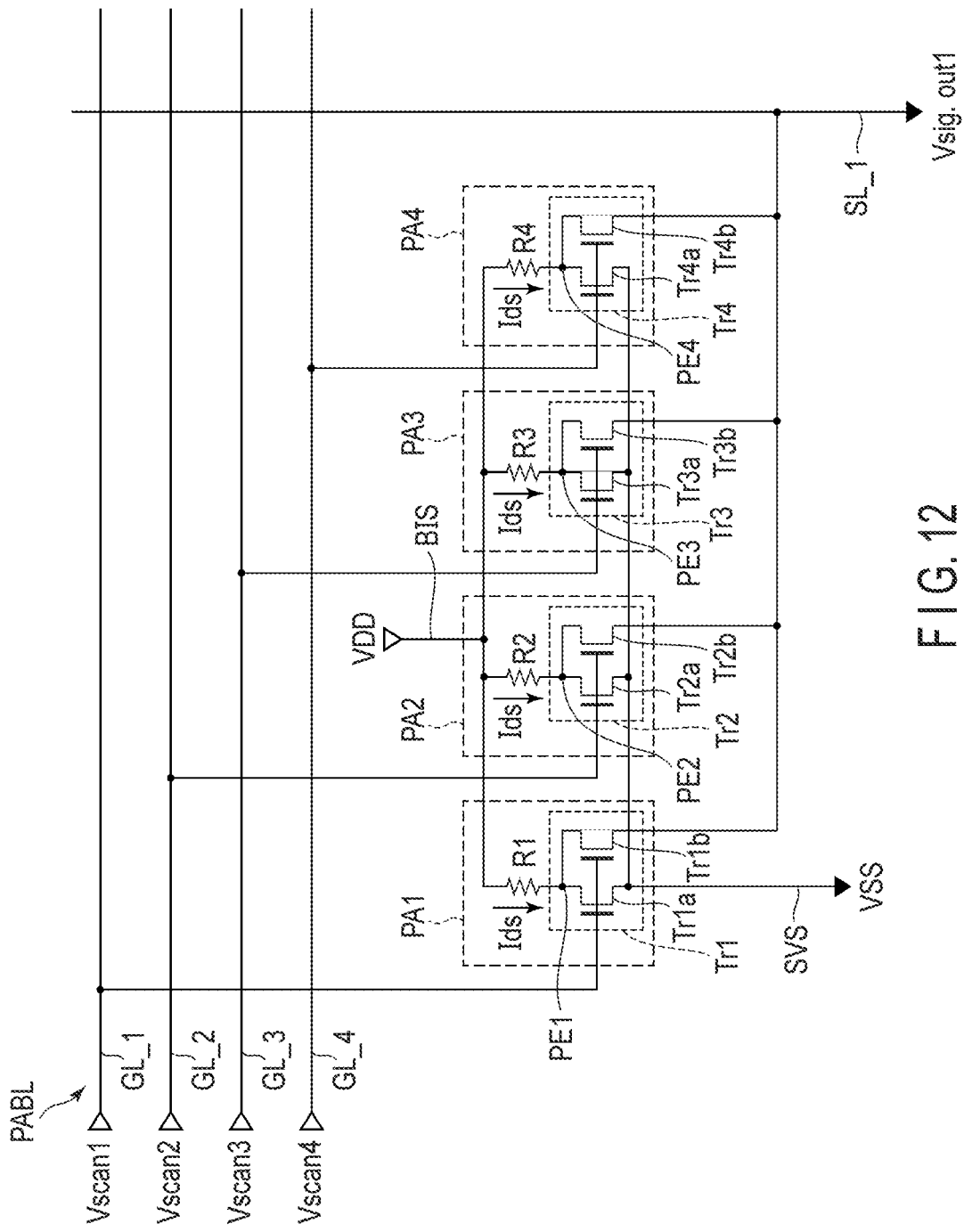
FIG. 12 shows a circuit configuration of the individual area block in Embodiment 1.

FIG. 12 shows a circuit configuration of the individual area block PABL in the present configuration example. In the individual area block PABL shown in FIG. 12, as an example, the individual areas PA at the first row and first column, the second row and first column, the third row and first column, and the fourth row and first column are respectively shown as the individual area PA1, the individual area PA2, the individual area PA3, and the individual area PA4. However, the order of rows and columns is not limited to this.

The gate of the transistor Tr1a and the gate of the transistor Tr1b in the individual area PA1 are both electrically connected to the scanning line GL_1. One of the source and drain of the transistor Tr1b is electrically connected to the signal line SL_1.

The gate of the transistor Tr2a and the gate of the transistor Tr2b in the individual area PA2 are both electrically connected to the scanning line GL_2. One of the source and drain of the transistor Tr2b is electrically connected to the signal line SL_1.

The gate of the transistor Tr3a and the gate of the transistor Tr3b in the individual area PA3 are both electrically connected to a scanning line GL 3. One of the source and drain of the transistor Tr3b is electrically connected to the signal line SL_1.

The gate of the transistor Tr4a and the gate of the transistor Tr4b in the individual area PA4 are both electrically connected to a scanning line GL 4. One of the source and drain of the transistor Tr4b is electrically connected to the signal line SL_1.

Figure 13:
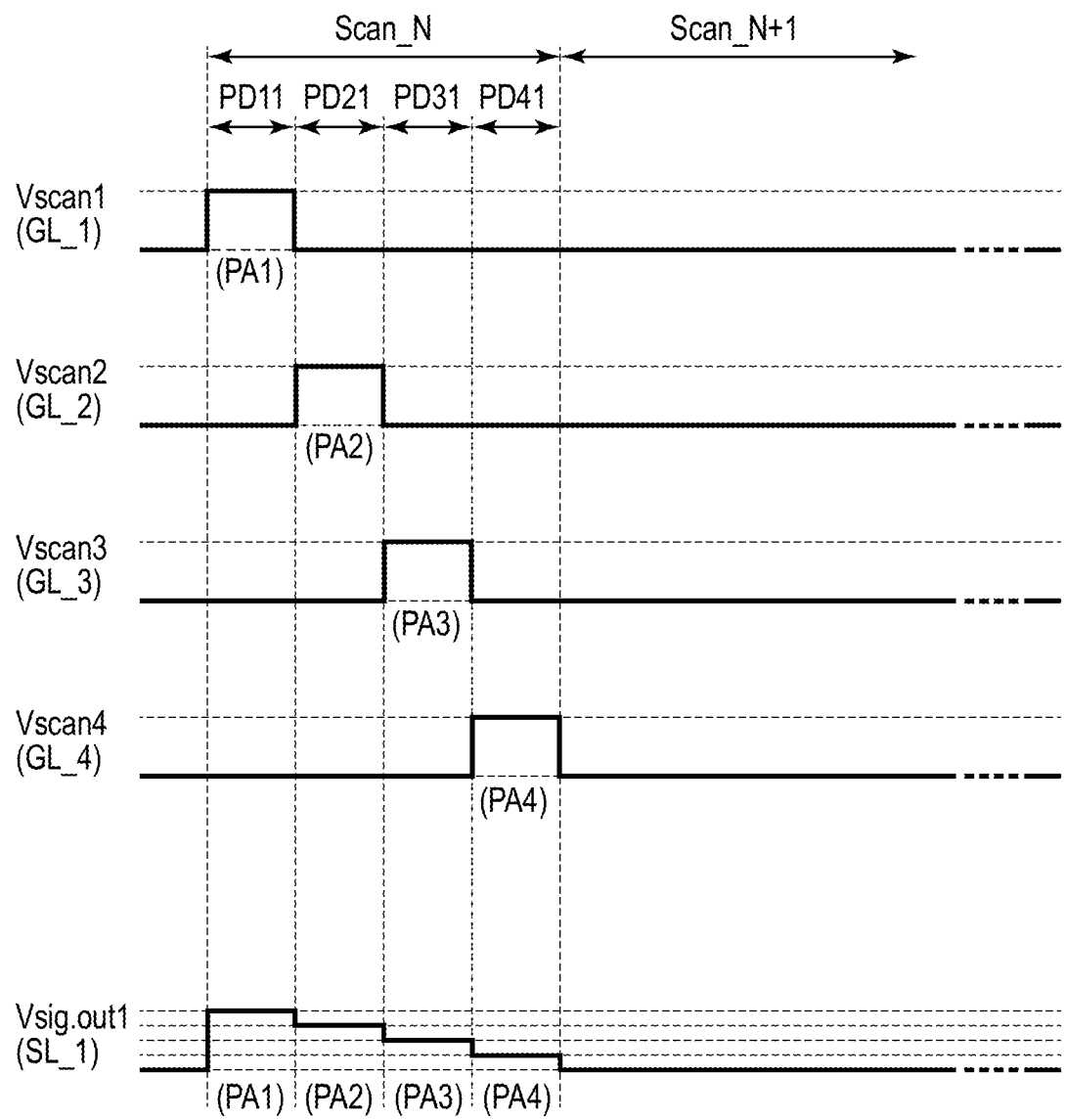
FIG. 13 is a timing chart of the individual area block.

FIG. 13 is a timing chart of the individual area block PABL. As shown in FIG. 13, a signal Vscan1 is input to the scanning line GL_1, a signal Vscan2 is input to the scanning line GL_2, a signal Vscan3 is input to the scanning line GL 3, and a signal Vscan4 is input to the scanning line GL 4.

Vscan1 is at H level in period PD11, and is at L level in period PD21, period PD31, and period PD41.

Vscan2 is at H level in period PD21, and is at L level in period PD11, period PD31, and period PD41.

Vscan3 is at H level in period PD31, and is at L level in period PD11, period PD21, and period PD41.

Vscan4 is a H level in period PD41, and is at L level in period PD11, period PD21, and period PD31.

When stress is applied to the individual area block PABL, the resistance value of the sensor layer FSL changes as described above, and a voltage corresponding to the changed resistance value is output as the signal Vsig.out. The signal line SL_1 outputs a signal Vsig.out1.

In period PD11, the stress detected in the individual area PA1, in period PD21, the stress detected in the individual area PA2, in period PD31, the stress detected in the individual area PA3, and, in period PD41, the stress detected in the individual area PA4 are output as the signal Vsig.out.

Period PD11, period PD21, period PD31, and period PD41 in which the detection operation of any individual areas PA1 to PA4 is performed are referred to as period Scan_B (B is a natural number). Period Scan_1 is the drive period of the scanning lines GL_1 to GL 4. After the end of period Scan_1, driving of the scanning lines GL 5 and GL 8 is started. The drive period of the scanning lines GL 5 to GL 8 is referred to as period Scan_2. In this manner, all scanning lines GL in the sensor area SA are driven.

In the present configuration example, the same effect as the above-mentioned embodiment is achieved.

Configuration Example 3

Figure 14:
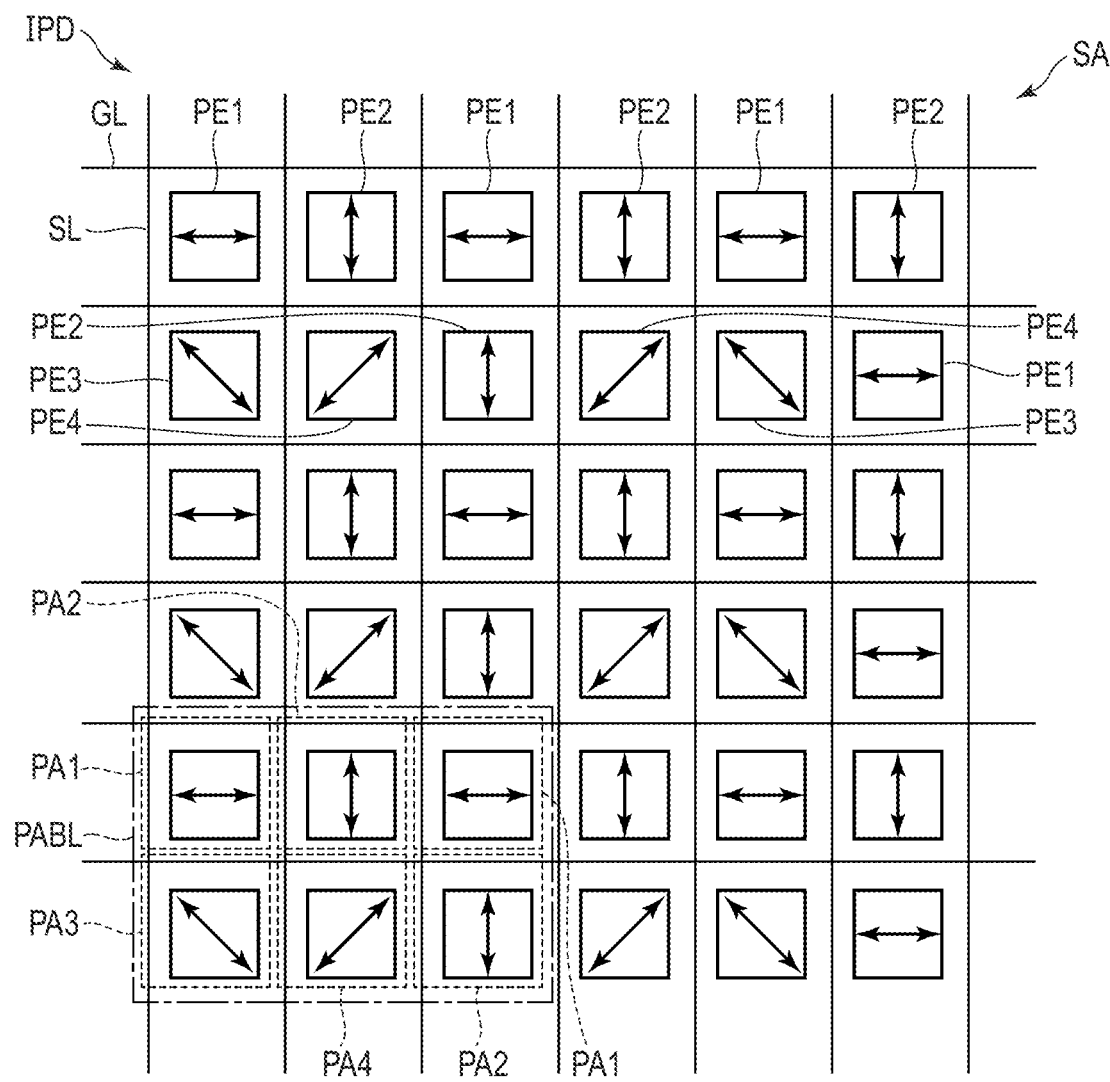
FIG. 14 is a plan view showing another configuration example of the sensor device in Embodiment 1.

FIG. 14 is a plan view showing another configuration example of the sensor device in the present embodiment. The configuration example shown in FIG. 14 differs from the configuration example shown in FIG. 4 in that the ratio of the number of individual areas within one individual area block is different.

The sensor device IPD shown in FIG. 14 includes in one individual area block, two individual areas PA1, two individual areas PA2, one individual area PA3, and one individual area PA4. That is, the number of individual areas PA1 and the number of individual areas PA2 are twice as many as the number of individual areas PA3 and the number of individual areas PA4.

Note that, in FIG. 14, only the scanning lines GL, the signal lines SL, the individual electrodes PE, and the electric fields EF are shown to make the drawing easier to read. Furthermore, in FIG. 14, the individual electrode PE and the common electrode CE are shown together as the individual electrode PE.

In FIG. 14, in one individual area block PABL of the sensor area SA, the individual area PA1 is arranged in the rth row and sth column, the individual area PA2 is arranged in the rth row and (s+1)th column, and the individual area PA1 is arranged in the rth row and (s+2)th column.

Furthermore, the individual area PA3 is arranged in the (r+1)th row and sth column, the individual area PA4 is arranged in the (r+1)th row and (s+1)th column, and the individual area PA2 is arranged in the (r+1)th row and (s+2)th column (where r is a natural number between 1 and (M−2), and s is a natural number between 1 and (N−1)).

In the individual area block PABL described above, the ratio of the numbers of individual areas that detect the change in resistance (expansion and contraction) in the first direction X and the second direction Y and the change in resistance (shear stress) in the fourth direction DX and the fifth direction DY is 2:1. In other words, the ratio of the sensitivities in the first direction X and the second direction Y, as well as in the fourth direction DX and the fifth direction DY is 2:1.

Note that, in the present configuration example, an example of setting the ratio of the individual areas PA to 2:1 is described. However, the ratio of the individual areas PA can be changed as needed.

It is preferable to have the same number of individual areas PA1 and PA2 for detecting expansion and contraction, and the same number of individual areas PA3 and PA4 for detecting shear stress. However, the number of individual areas PA1 and the number of individual areas PA2 may be different from the number of individual areas PA3 and the number of individual areas PA4. For example, the number of individual areas PA1 and the number of individual areas PA2 may be t times or (1/t) times (where t is a natural number) the number of individual areas PA3 and the number of individual areas PA4. In this case, the ratio of sensitivities in the first direction X and the second direction Y, and the fourth direction DX and the fifth direction DY becomes t:1 or 1:t.

In the present configuration example, the example of changing the ratio of the individual areas PA of the sensor device IPD having the square pixel array aspect shown in FIG. 4 is described; however, is not limited thereto. The present configuration example can be applied to the sensor devices IPD described in FIG. 8 and FIG. 11. For example, in FIG. 8, the column of individual area PA1 and the column of individual area PA2 may be added continuously to the column of individual area PA4. For example, in FIG. 11, the row of individual area PA1 and the row of individual area PA2 may be added continuously to the row of individual area PA4.

In the present configuration example, the same effect as the above-mentioned embodiment is achieved.

Configuration Example 4

Figure 15:
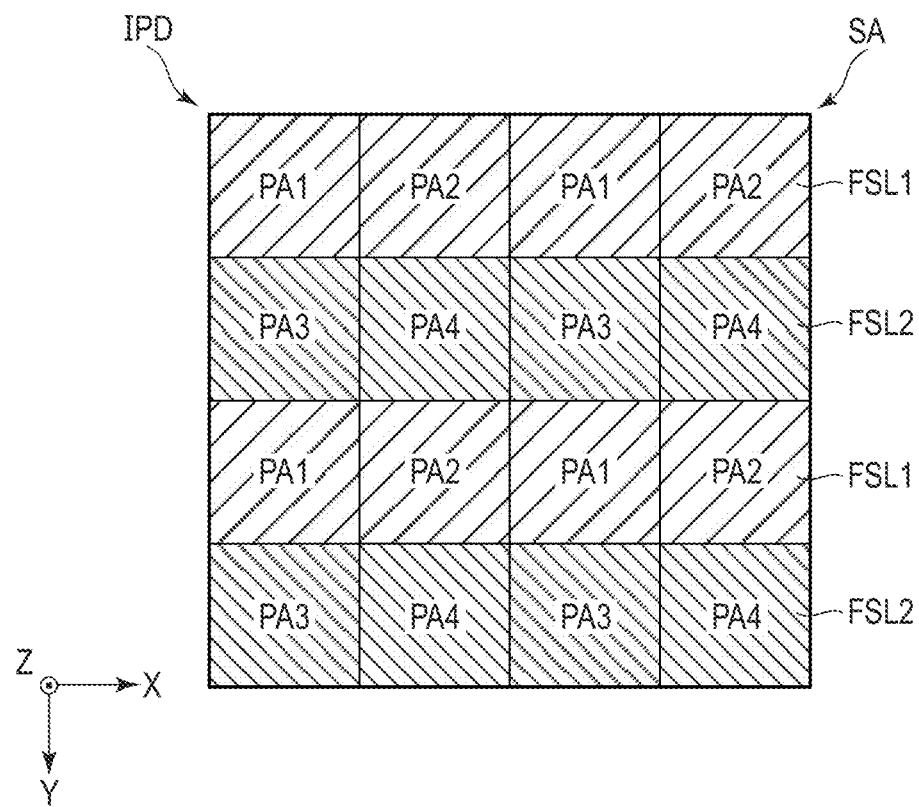
FIG. 15 is a plan view showing another configuration example of the sensor device in Embodiment 1.

FIG. 15 is a plan view showing another configuration example of the sensor device in the present embodiment. The configuration example shown in FIG. 15 differs from the configuration example shown in FIG. 4 in that it includes sensor layers with different sensitivities.

The sensor device IPD shown in FIG. 15 is provided with a sensor layer FSL1 in the individual areas PA1 and PA2, and a sensor layer FSL2 in the individual areas PA3 and PA4. The sensor layers FSL1 and FSL2 in the present configuration example have different sensitivities to each other. In other words, the amount of change in the resistance value in the case of being bent by the same force differ between the sensor layers FSL1 and FSL2. In FIG. 15, the sensor layer FSL1 is more sensitive than the sensor layer FSL2. For example, in a case where the sensor layers FSL1 and FSL2 are configured by the pressure-sensitive materials described above, the amount of conductive particles included in the sensor layer FSL1 should be larger than that in the sensor layer FSL2.

Figure 16:
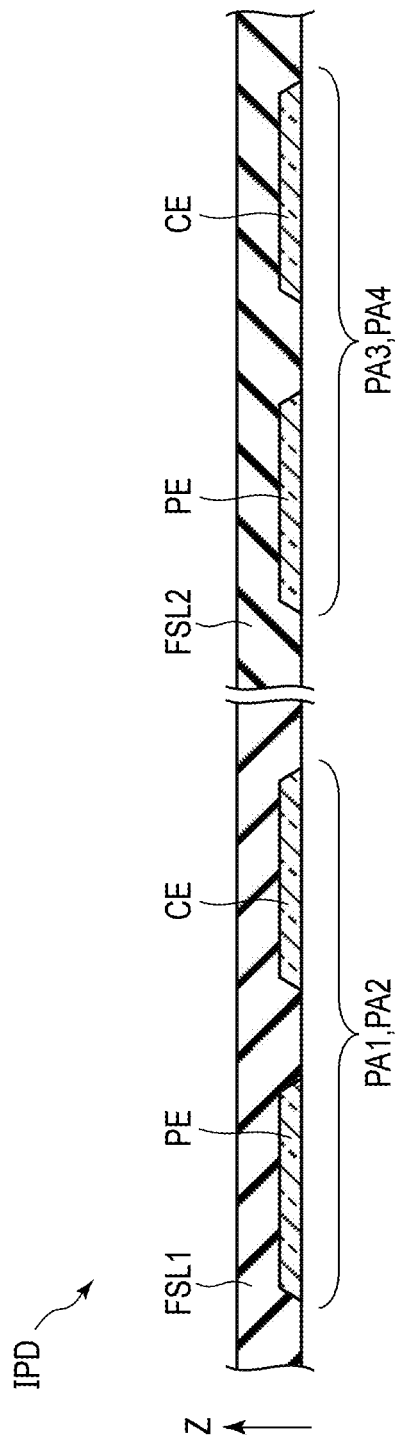
FIG. 16 is a schematic cross-sectional view of FIG. 15.

FIG. 16 is a schematic cross-sectional view of FIG. 15. However, in FIG. 16, components other than the individual electrode PE, the common electrode CE, and the sensor layers FSL1 and FSL2 refer to FIG. 5 and are omitted.

As shown in FIG. 16, the sensor layer FSL1 is arranged above the individual electrode PE1 and the common electrode CE1 in the individual area PA1 and the individual electrode PE2 and the common electrode CE2 in the individual area PA2. The sensor layer FSL2 is arranged above the individual electrode PE3 and the common electrode CE3 in the individual area PA3 and the individual electrode PE4 and the common electrode CE4 in the individual area PA4.

The sensor layers FSL1 and FSL2 are formed by applying different layers, for example, by an ink jet method.

Note that, in the present configuration example, an example of using two sensor layers with different sensitivities is described, but the number of sensor layers is not limited to this. The sensor device IPD in the present configuration example may have two or more sensor layers with different sensitivities, if necessary.

In the present configuration example, the same effect as the above-mentioned embodiment is achieved.

Configuration Example 5

Figure 17:
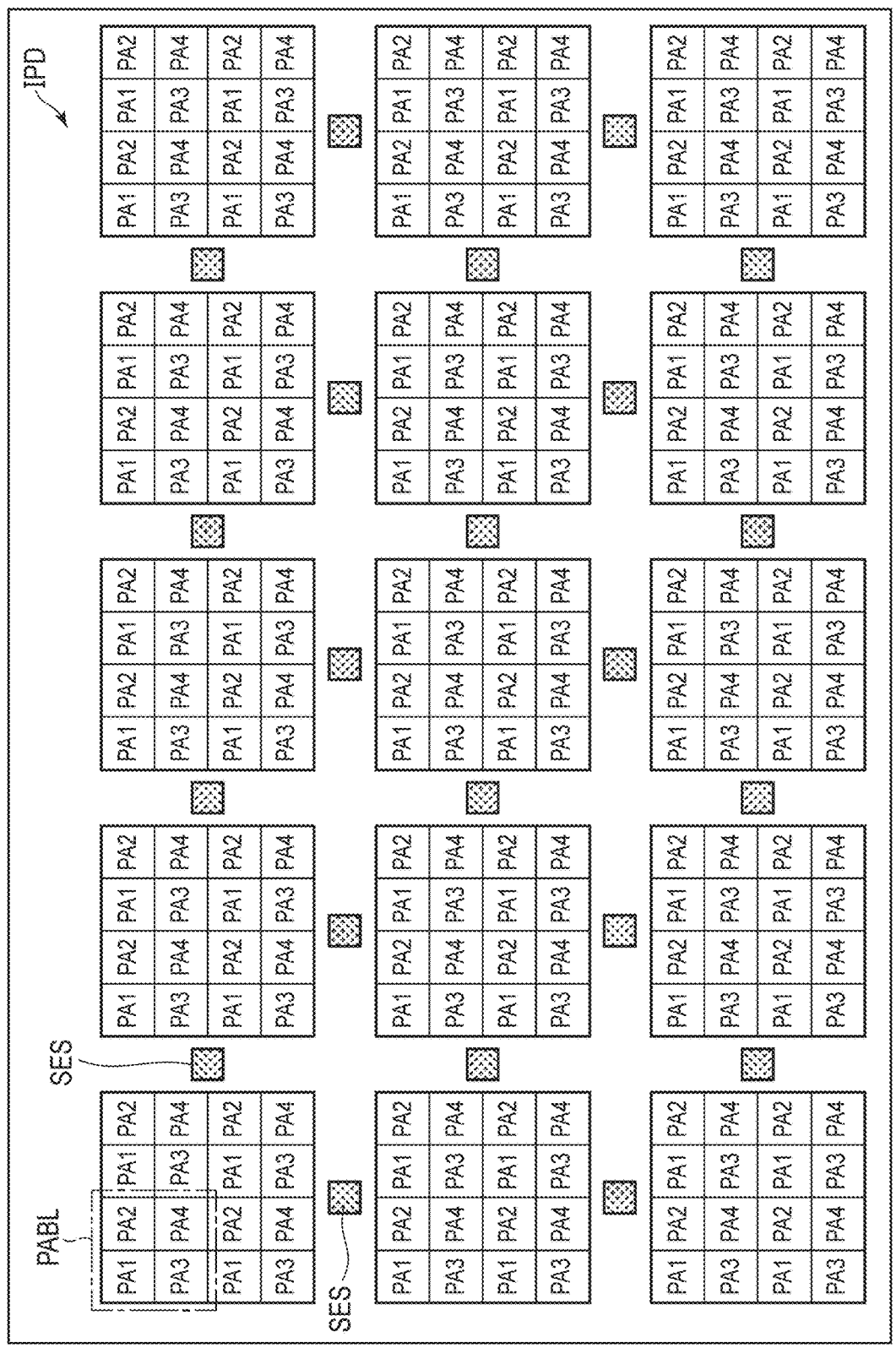
FIG. 17 is a plan view showing another configuration example of the sensor device in Embodiment 1.

FIG. 17 is a plan view showing another configuration example of the sensor device in the present embodiment. The configuration example shown in FIG. 17 differs from the configuration example shown in FIG. 4 in that it has a sensor capable of acquiring position information.

In the sensor device shown in FIG. 17, a sensor SES capable of acquiring position information is provided for every two individual area blocks PABL in the first direction X and second direction Y, respectively.

The sensor SES is a semiconductor sensor formed by semiconductors, for example, and is at least one of an acceleration sensor, an angular rate sensor (gyro sensor), and a geomagnetic sensor. Note that a plurality of sensors SES may be provided.

It is desirable that the position information detected by the individual area PA has no deviation from an original position. However, in a case where the position information detected by the individual area PA deviates from the original position, the position deviation increases as the number of individual areas PA increases. Such position deviation can be corrected by the sensor SES.

Note that, in the present configuration example, an example of providing the sensor SES every two individual area blocks PABL or every four individual area blocks PABL in the first direction X and second direction Y, respectively, is described. However, the number of sensors SES is not limited to this. The number of sensors SES can be changed as needed.

Furthermore, in the present configuration example, an example of providing the sensor SES in a position that does not overlap with the individual area PA is described, but the position of the sensor SES is not limited to this. The sensor SES may be provided inside any individual area PA.

In the present configuration example, the same effect as the above-mentioned embodiment is achieved.

Embodiment 2

Figure 18:
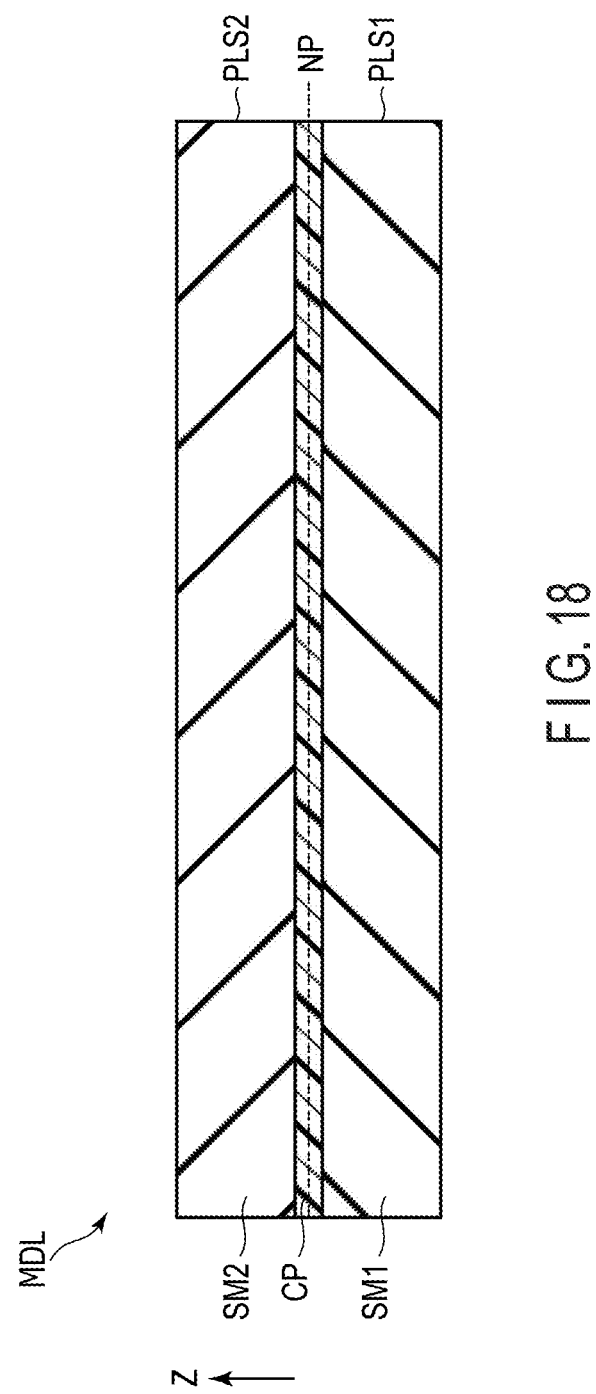
FIG. 18 is a schematic cross-sectional view showing a module in Embodiment 2.

In Embodiment 1, the case in which a module is only deformed by bending has been described. In the present embodiment, to distinguish between bending deformation of the module and expansion and contraction of the entire module, a module in which multiple sub-modules are stacked is described. FIG. 18 is a schematic cross-sectional view showing the module of the present embodiment. A module other than a stress coupling layer CP, such as a display or a touch panel, may be present between a sub-module SM1 and a sub-module SM2.

A module MDL shown in FIG. 18 includes the sub-module SM1, the stress coupling layer CP, and the sub-module SM2. They are stacked in this order in the third direction Z. In addition, side surfaces of the submodules SM1 and SM2 are respectively referred to as side surfaces PLS1 and PLS2.

Furthermore, the module MDL includes a controller (not shown). The controller is electrically connected to sub-modules SM1 and SM2 and controls driving the sub-modules SM1 and SM2. It also compares measurement values taken by the sub-modules SM1 and SM2 and outputs the measurement values externally.

The controller may be the controller described in Embodiment 1 or another controller electrically connected to the controller described in Embodiment 1.

The sub-modules SM1 and SM2 shown in FIG. 18 are equivalent to the sensor device IPD described in Embodiment 1. In the present embodiment, the sensor device IPD of Embodiment 1 is considered as one sub-module, and a module in which multiple sub-modules (sensor devices IPD) are stacked is described.

Here, a stress coupling layer is a layer that fixes multiple members to each other. Members coupled by the stress coupling layer deform integrally. Therefore, the module MDL including the sub-modules SM1 and SM2 shown in FIG. 18 has a single neutral plane NP. In other words, the sub-modules SM1 and SM 2 of the module MDL are arranged facing the third direction across the neutral plane NP.

The stress coupling layer CP is formed using a material containing acrylic resin, silicone resin, urethane resin, or the like. The stress coupling layer CP is formed, for example, by room temperature curing, thermal curing, or UV curing. In the case where the stress coupling layer CP is formed by thermal curing, the resin used is preferable to be a resin that cures at 100° C. or less. Furthermore, the stress coupling layer CP is formed by lamination, such as atmospheric pressure lamination or vacuum lamination. Furthermore, the thickness of the stress coupling layer CP is 10 µm to 250 µm, preferably 25 µm to 100 µm.

In the module MDL shown in FIG. 18, since the stress coupling layer CP is arranged between the sub-modules SM1 and SM2, in a case where the entire module MDL is expanded or contracted, both the sub-module SM1 and the sub-module SM2 are expanded or contracted. In such cases, since the direction of distortion will be the same, it can be distinguished from the bending deformation.

Configuration Example 1

Figure 19:
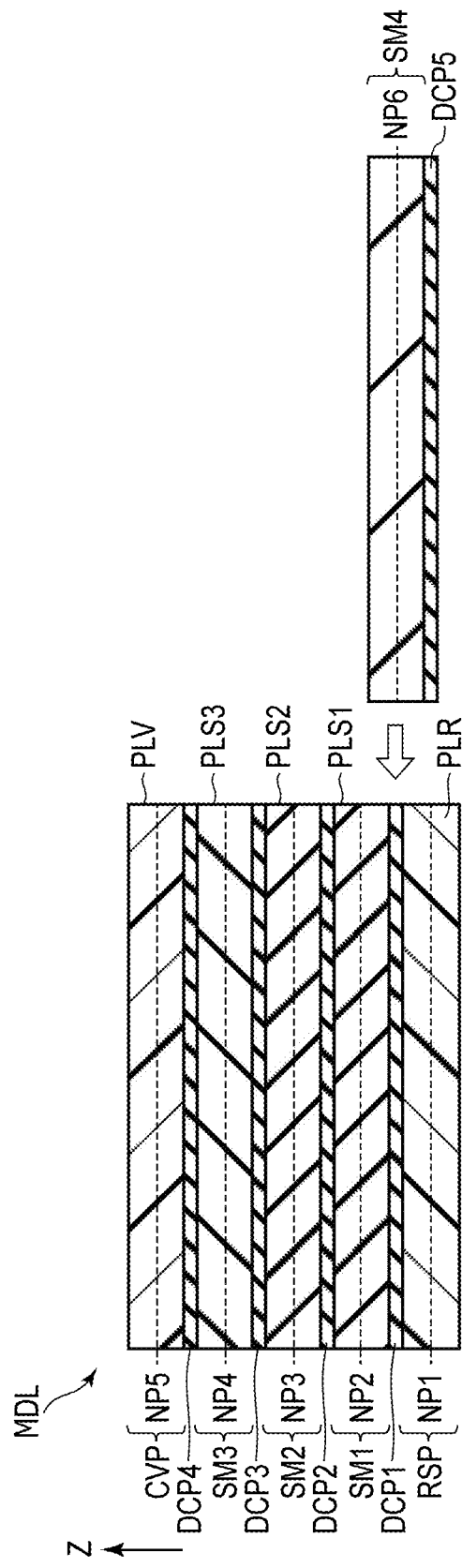
FIG. 19 is a schematic cross-sectional view showing a module in a configuration example.

FIG. 19 is a schematic cross-sectional view showing a module in the present configuration example. The module shown in FIG. 19 differs from the configuration example shown in FIG. 18 in that a plurality of sub-modules are stacked via a stress decoupling layer.

The module MDL shown in FIG. 19 includes a support substrate RSP, a stress decoupling layer DCP1, a sub-module SM1, a stress decoupling layer DCP2, a sub-module SM2, a stress decoupling layer DCP3, a sub-module SM3, a stress decoupling layer DCP4, and a cover member CVP. These are stacked in this order in the third direction Z.

Note that, in the module MDL shown in FIG. 19, the support substrate RSP, the sub-module SM1, the sub-module SM2, the sub-module SM3, and the cover member CVP will be referred to as side surfaces PLR, PLS1, PLS2, PLS3, and PLV, respectively.

Note that, in the present configuration example, in a case where there is no particular need to distinguish between the sub-modules SM1 to SM3, they are generally referred to as the sub-modules SM. In addition, in a case where there is no particular need to distinguish between the stress decoupling layers DCP1 to DCP4 and DCP5 (described below), they are generally referred to as the stress decoupling layers DCP. The number of sub-modules SM and stress decoupling layers DCP is not limited to the above, and can be changed as needed.

In the present configuration example, the stress decoupling layer corresponds to a layer that decouples stress between multiple sub-modules when the module MDL is bent. Even when the module MDL is bent, since the sub-modules slide on the stress decoupling layer, the stresses generated in multiple sub-modules do not affect each other.

In FIG. 19, for example, the stress decoupling layer DCP2 is arranged between the sub-module SM 1 and the submodule SM2. This allows the submodule SM1 and the submodule SM2 to have a single neutral plane NP2 and NP3, respectively.

Similarly, the support substrate SP, the sub-module SM3, and the cover member CVP have neutral planes NP1, NP4, and NP5, respectively.

The stress decoupling layer DCP is configured by including a nonlinear elastic body or at least one of a nonlinear elastic body and a viscous fluid. Note that it may also be configured by including both a nonlinear elastic body and a viscous fluid.

The elastic modulus of the nonlinear elastic body is 100 KPa or less, preferably 10 KPa or less. Elastic modulus here refers in particular to shear modulus, tensile storage modulus, and shear storage modulus. The nonlinear elastic body must have a high degree of adhesion with respect to the sub-modules SM arranged above and below thereof and be capable of large deformation. For example, the amount of deformation, expressed in terms of tensile elongation, is 150% or more, preferably 200% or more. By using the nonlinear elastic body in the stress decoupling layer DCP, the module MDL is given the restorability to return to the state before bending. The thickness of the stress decoupling layer is from 10 µm to 250 µm, preferably from 25 µm to 100 µm.

The nonlinear elastic body is, for example, an elastic adhesive formed using a material containing acrylic resin, silicon resin, urethane resin, natural rubber, synthetic rubber, or the like. Furthermore, the nonlinear elastic body shows a rubber state in the operating temperature range of the module MDL. Note that the operating temperature range here is, for example, 0 to 50° C. The nonlinear elastic body is formed, for example, by room temperature curing, thermal curing, or UV curing. In the case where the nonlinear elastic body is formed by thermal curing, the resin used should be a resin that cures at 100° C. or lower. The nonlinear elastic body is formed, for example, by lamination such as atmospheric pressure lamination or vacuum lamination, by coating using jet dispensers or inkjet, etc., or by photolithography in the case of photosensitive resins.

The viscosity of the viscous fluid is 100 cP or higher, preferably 1000 cP or higher. By using a viscous fluid in the stress decoupling layer DCP, flexibility in the operation of bending the module MDL can be provided.

The viscous fluid is formed using a material containing a polymer, polymer mixture, or polymer gel, etc. The viscous fluid can also be air. Note that a viscous fluid used for the viscous fluid is a Newtonian fluid or a non-Newtonian fluid.

The ratio of materials used for the stress decoupling layer DCP and its composition are selected with emphasis on the restorability of the position of each member after bending the module MDL and the flexibility of the bending operation. For example, in the case where the restorability of the position of each member is emphasized, the material used for the stress decoupling layer DCP is the nonlinear elastic material. Furthermore, in the case where the flexibility of operation is emphasized over the restorability of position, the viscous fluid is used. The stress decoupling layer DCP may be formed by using multiple nonlinear elastic bodies with different elastic moduli or by using both the nonlinear elastic body and the viscous fluid to adjust the elastic modulus of the entire layer. By using both the nonlinear elastic body and the viscous fluid in the stress decoupling layer DCP, it is possible to control the sense of operation with the viscous fluid while ensuring position restoration with the nonlinear elastic body. Note that a plurality of different materials, which are linear elastic materials, may be used and a plurality of different materials, which are viscous fluids, may be used.

The sub-module SM is, for example, a flexible sensor device, display device, and feedback device. For example, the sensor device IPD described in Embodiment 1 may be arranged as the sub-module SM1, and a flexible sensor device of a different type from the sensor device IPD of Embodiment 1 may be arranged as the sub-module SM2. Furthermore, as the sub-module SM3, a flexible display device, a so-called sheet display, may be arranged.

Alternatively, a tactile/force sensing interface (also referred to as a haptics interface) may be arranged as the sub-module SM2. By using the tactile/force sensing interface, the user may be fed back information on his/her own 3D shape measured by the sensor device IPD (sub-module SM1), or the 3D shape of an object OBJ to which the sensor device is attached as a sense of touch and force.

Alternatively, multiple sensor devices of different types may be stacked as the sub-modules SM1 to SM3 to form the module MDL.

Note that the number and order in which each sub-module SM is stacked is not limited to the above and can be changed as needed. In addition, the layers connecting the sub-modules SM do not all have to be stress decoupling layers DCP, but may be stress coupling layers CP or those having properties between the stress coupling layers CP and the stress decoupling layers DCP.

Note that, in the present embodiment, the submodules SM1 to SM4 are also referred to as a first sub-module, a second sub-module, a third sub-module, and a fourth sub-module.

The support substrate RSP is a flexible support member, for example, a resin substrate made of an inexpensive material with excellent heat resistance, moisture resistance, and strength.

The cover member CVP is a flexible protective member, which is, for example, a plastic film. In addition, in a case where the sub-module SM adjacent to the cover member CVP is a display device, the cover member CVP may include, in addition to the film described above, an optical film or the like of the display device, which is, for example, a polarizing plate.

In the present configuration example, flexible support members, sub-modules, protective members, etc., may be referred to as flexible devices in general.

Figure 20:
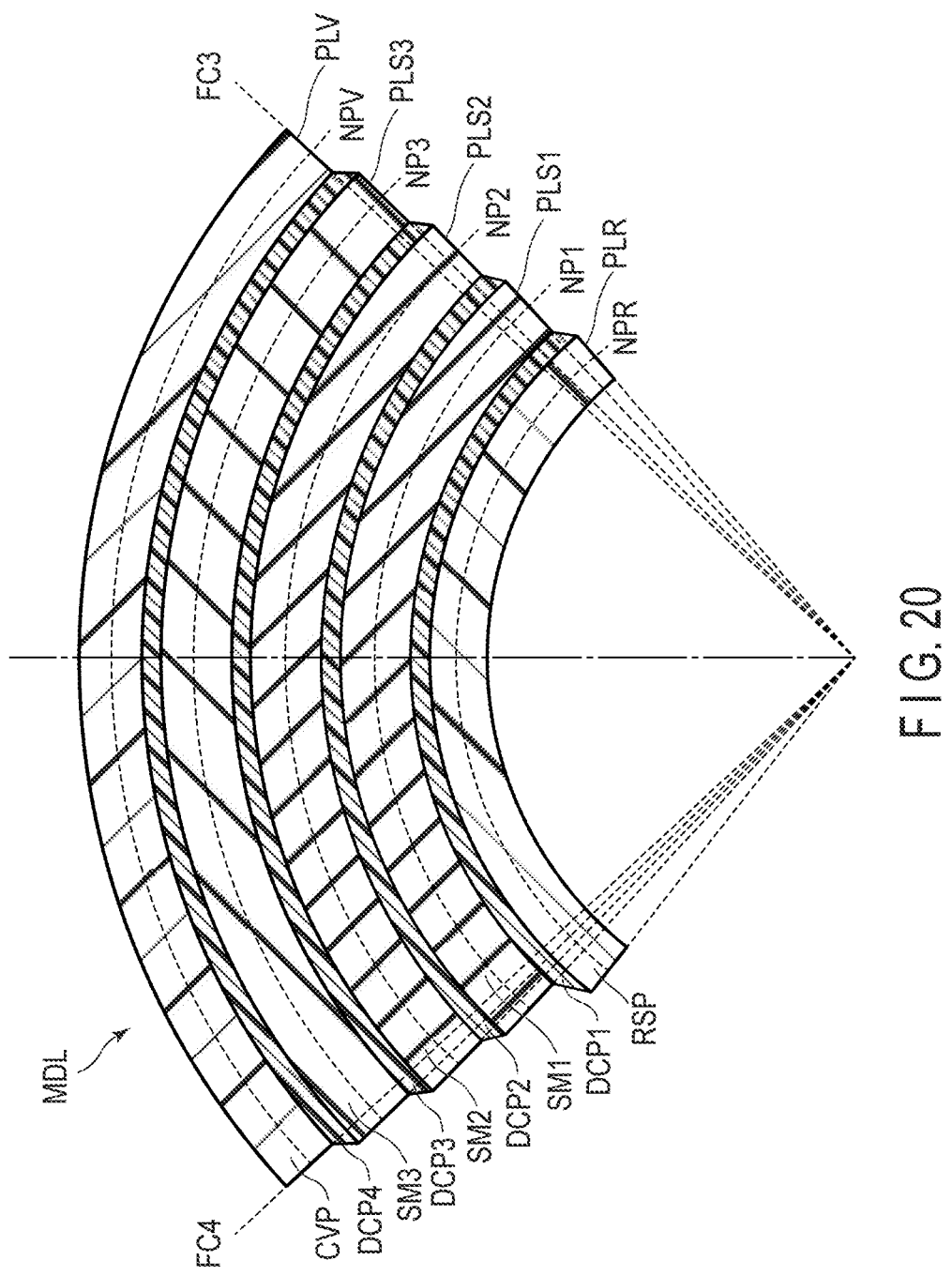
FIG. 20 is a cross-sectional view showing a state when the module shown in FIG. 19 is bent.

FIG. 20 is a cross-sectional view of the module MDL shown in FIG. 19 when bent. In FIG. 20, the state of an area between surface FC3 and surface FC4 of the module MDL is shown. Since the module MDL has the same configuration from surface FC3 to surface FC4, here, the surface FC3 side will be focused and described.

As described above, the stress decoupling layer DCP1 is arranged between the support substrate RSP and the sub-module SM1, the stress decoupling layer DCP2 is arranged between the sub-module SM1 and the sub-module SM2, the stress decoupling layer DCP3 is arranged between the sub-module SM2 and the sub-module SM3, and the decoupling layer DCP4 is arranged between the sub-module SM3 and the cover member CVP. Therefore, in a case where the module MDL is bent, the side surface PLR of the support substrate RSP, the side surface PLS1 of the sub-module SM1, the side surface PLS2 of the sub-module SM2, the side surface PLS3 of the sub-module SM3, and the side surface PLV of the cover member CVP do not match.

In FIG. 20, the side surface PLS3 of the sub-module SM3 is located outside the side surface PLV of the cover member CVP. The side surface PLS2 of the sub-module SM2 is located outside the side surface PLS3 of the sub-module SM3. The side surface PLS1 of the sub-module SM1 is located outside the side surface PLS2 of the sub-module SM2. The side surface PLR of the support substrate RSP is located outside the side surface PLS1 of the sub-module SM1.

As described above, by providing the stress decoupling layer DCP between the sub-modules SM, between the support substrate RSP and the sub-module SM, and between the sub-module SM and the cover member CVP of the module MDL, each neutral plane NP can control bending independently.

Returning now to FIG. 19, a case in which a new sub-module is added to the module MDL will be described. A sub-module SM4 shown in FIG. 19 has a neutral plane NP6. Furthermore, the sub-module SM4 is provided with a stress decoupling layer DCP5 in contact with its lower surface.

Each flexible device can be freely added or replaced through the stress decoupling layer DCP. For example, the sub-module SM4 and the stress decoupling layer DCP5 can be added between the support substrate RSP and the stress decoupling layer DCP1. After the addition, the support substrate RSP, the stress decoupling layer DCP5, the sub-module SM4, and the stress decoupling layer DCP1 are stacked in this order. Since the support substrate RSP and the sub-module SM4 are separated by the stress decoupling layer DCP5, and the sub-module SM4 and the sub-module SM1 are separated by the stress decoupling layer DCP1, the sub-module SM4 and the sub-module SM1 can be independently controlled at their respective neutral planes NP6 and NP2.

FIG. 21 is a schematic view showing an example configuration of the module MDL shown in FIG. 19. The module MDL shown in FIG. 21 includes the sub-modules SM1 to SM3, and a controller CTR. The sub-modules SM1 to SM3 are connected to the controller CTR, respectively. The stress decoupling layers DCP1 to DCP3 are provided in the sub-modules SM1 to SM3, respectively.

The sub-module SM1 shown in FIG. 21 is the sensor device IPD shown in Embodiment 1. In the sub-module SM1, a stress decoupling layer DCP, a substrate SUB1, and a sensor layer FSL are stacked in this order in the third direction Z. The substrate SUB1 is connected to the controller CTR and is controlled by a control signal from the controller CTR, and outputs measurement data (e.g., signal Vsig.out) measured at the sub-module SM1 to the controller CTR. Note that a pressure-sensitive material layer is arranged deviated from the neutral plane NP1.

The sub-module SM2 shown in FIG. 21 is a tactile/force sensing interface (haptics interface). The sub-module SM2 includes an actuator HPF.

In response to the control signal from the controller CTR, the sub-module SM2 uses the actuator HPF to feed back tactile and force sensing information, such as vibration and weak current, to a user.

In FIG. 21, the actuator HPF is assumed to be an actuator that contains a drive element (e.g., transistor) inside. However, as with the sub-module SM1, the substrate including the drive element, etc., and the actuator may be separate layers, and they may be in a stacked structure.

The sub-module SM3 shown in FIG. 21 is a display device, specifically a sheet display. The sub-module SM3 includes a substrate SUB2 and a display functional layer DSP. The substrate SUB2, as in the substrate SUB1, includes transistors, signal lines, scanning lines, etc., as drive elements. The substrate SUB2 also includes pixel electrodes and common electrodes that drive the display functional layer DSP. The display functional layer DSP may be, for example, a liquid crystal layer, an organic electro-luminescence (EL) layer, a micro LED layer, etc. Note that, in the present configuration example, a micro LED refers to a light-emitting diode (LED) whose longest side has a length of 100 μm or less.

The substrate SUB2 is connected to the controller CTR and is controlled by a control signal from the controller CTR. Based on the control signal received by the substrate SUB2, the drive elements in the substrate SUB2 and the display functional layer DSP are driven, and display is performed.

The following describes, for example, a case in which the module MDL of FIG. 21 is applied to a garment. The module MDL is placed in close contact with a user's body, and the shape information of the body is measured by the sub-module SM1, which is a sensor device.

The sub-module SM3, which is a sheet display, displays the shape, color, etc., of the garment. The sub-module SM2, which is a tactile/force sensing interface, provides feedback to the user on tactile sensations such as the firmness and texture of the garment.

In a case where the user moves his/her body, the sub-module SM1 detects changes in the shape information of the module MDL and outputs it to the controller CTR. Based on the shape information output from the sub-module SM1, the controller CTR outputs tactile information and display information to the sub-modules SM2 and SM3, respectively.

For example, in a case where the user changes his/her pose, the shape change of the sub-module SM1 can be used to measure what kind of pose the user is in. The body shape information based on the changed pose is sent to the controller CTR. The controller CTR transmits control signals to the sub-modules SM2 and SM3 to change the tactile and display. The sub-module SM3 displays the shape of garment that will fit the changed pose. The sub-module SM2 also feeds back tactile information based on the changed pose, such as information on stretching and tightening of the garment, to the user.

In a case where the user desires to change the type of garment, the controller CTR outputs the information of the changed garment to sub-modules SM2 and SM3. Even if the type of garment is changed, the user can virtually try on the changed garment by the method described above.

As described above, the user can virtually try on a garment using only the module MDL, without actually having to prepare multiple garments.

According to the present configuration example described above, it is possible to obtain a module that can control the neutral plane for each sub-module.

In the present configuration example, the same effect as the above-mentioned embodiment is achieved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A sensor device comprising a plurality of sub-modules, one of the plurality of sub-modules comprising:
a substrate; and
a sensor layer superposed on the substrate, wherein
the substrate includes a plurality of individual areas arranged in a matrix in a first direction and a second direction that intersect each other;
the plurality of individual areas includes a first individual area, a second individual area, a third individual area, and a fourth individual area,
the first individual area is located next to the second individual area along the first direction, and the first individual area is located next to the third individual area along the second direction,
the second individual area is located next to the first individual area along the first direction, and the second individual area is located next to the fourth individual area along the second direction,
the first individual area includes a plurality of first individual linear electrodes and a plurality of first common linear electrodes both of which extend in the second direction, and each of first individual linear electrodes facing each of first common linear electrodes,
a plurality of first slits facing each other with the plurality of first individual linear electrodes and the plurality of first common linear electrodes interposed therebetween,
a first electric field between the first individual linear electrodes and the first common linear electrodes is generated in the first direction,
the second individual area includes a plurality of second individual linear electrodes and a plurality of second common linear electrodes both of which extend in the first direction, and each of second individual linear electrodes facing each of second common linear electrodes,
a plurality of second slits facing each other with the plurality of second individual linear electrodes and the plurality of second common linear electrodes interposed therebetween,
a second electric field between the second individual linear electrodes and the second common linear electrodes is generated in the second direction,
the third individual area includes a plurality of third individual linear electrodes and a plurality of third common linear electrodes both of which extend in a third direction intersecting at 45° clockwise to the second direction, and each of third individual linear electrodes facing each of third common linear electrodes,
a plurality of third slits facing each other with the plurality of third individual linear electrodes and the plurality of third common linear electrodes interposed therebetween,
a third electric field between the third individual linear electrodes and the third common linear electrodes is generated in a fourth direction intersecting at 45° counterclockwise to the second direction,
the fourth individual area includes a plurality of fourth individual linear electrodes and a plurality of fourth common linear electrodes both of which extend in the fourth direction, and each of fourth individual linear electrodes facing each of fourth common linear electrodes,
a plurality of fourth slits facing each other with the plurality of fourth individual linear electrodes and the plurality of fourth common linear electrodes interposed therebetween,
a fourth electric field between the fourth individual linear electrodes and the fourth common linear electrodes is generated in the third direction,
the plurality of sub-modules include a first sub-module and a second submodule,
a stress coupling layer is interposed between the first sub-module and the second submodule,
a neutral plane of the sensor device is formed in the stress coupling layer so that the first sub-module and the second submodule have in total a single neutral plane.

2. The sensor device according to claim 1, comprising a controller that controls the plurality of sub-modules, wherein
the controller measures expansion and contraction in the first direction and the second direction in each of the plurality of sub-modules, and measures bending in a third direction that intersects the first direction and the second direction by comparing measurement values of the plurality of sub-modules.

3. The sensor device according to claim 1, wherein
the plurality of sub-modules further include a second sub-module and a third sub-module,
one of the plurality of sub-modules is a first sub-module,
the second sub-module is a display device,
the third sub-module is a tactile/force sensing feedback device, and
the first to third sub-modules are stacked.

4. The sensor device according to claim 1, wherein
the plurality of first individual areas, the plurality of second individual areas, the plurality of third individual areas, and the plurality of fourth individual areas are in equal numbers.

5. The sensor device according to claim 1, wherein
the plurality of first individual areas and the plurality of second individual areas are in equal numbers,
the plurality of third individual areas and the plurality of fourth individual areas are in equal numbers, and
the plurality of first individual areas and the plurality of second individual areas are in different numbers from the plurality of third individual areas and the plurality of fourth individual areas.

6. The sensor device according to claim 1, wherein the sensor layer includes a plurality of sensor layers with different sensitivities.

7. The sensor device according to claim 1, further comprising a sensor which can acquire position information.

* * * * *